Oct. 15, 1946.  P. F. BARKER ET AL  2,409,240
DRESSING MECHANISM
Filed July 28, 1943  10 Sheets-Sheet 8

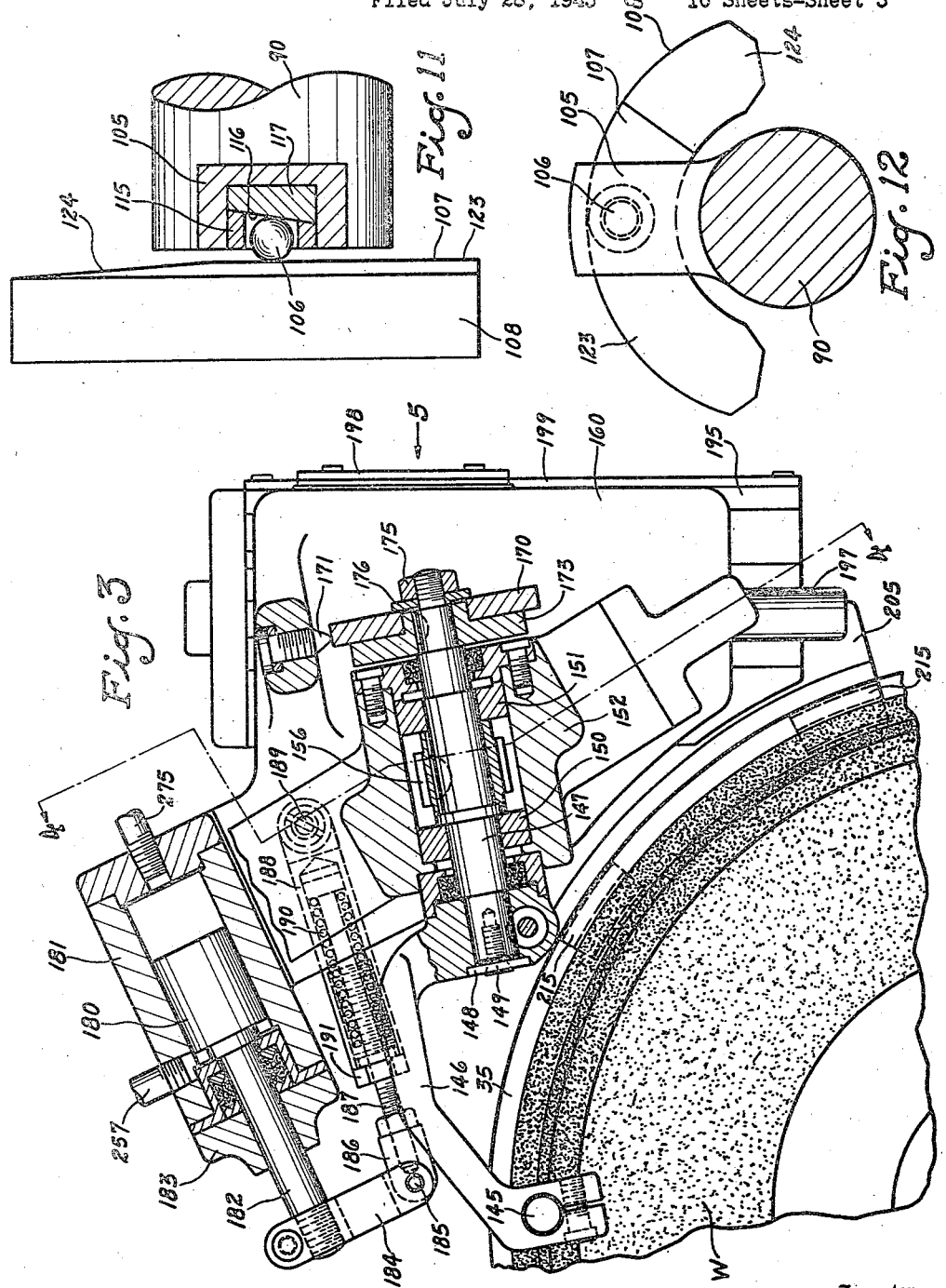

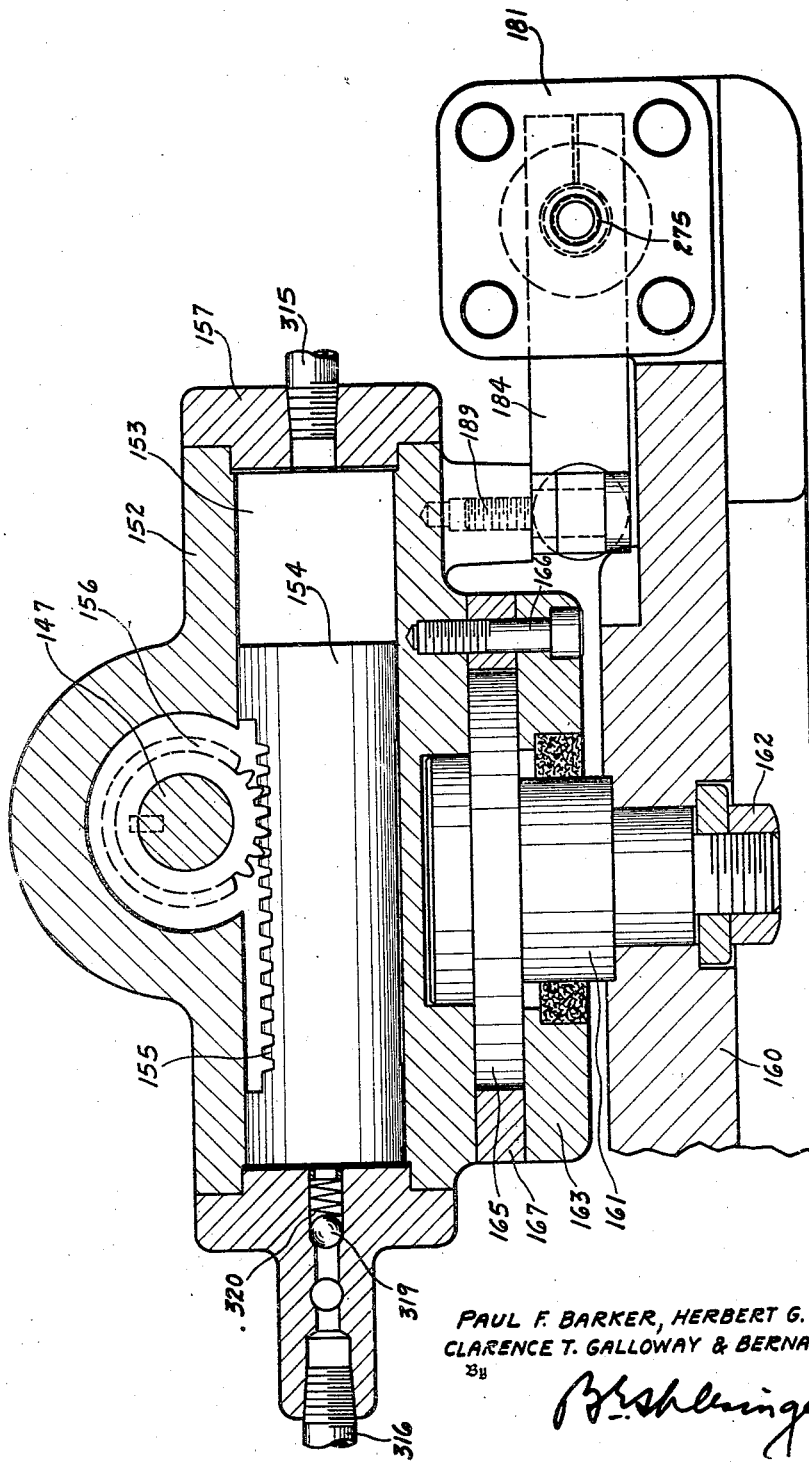

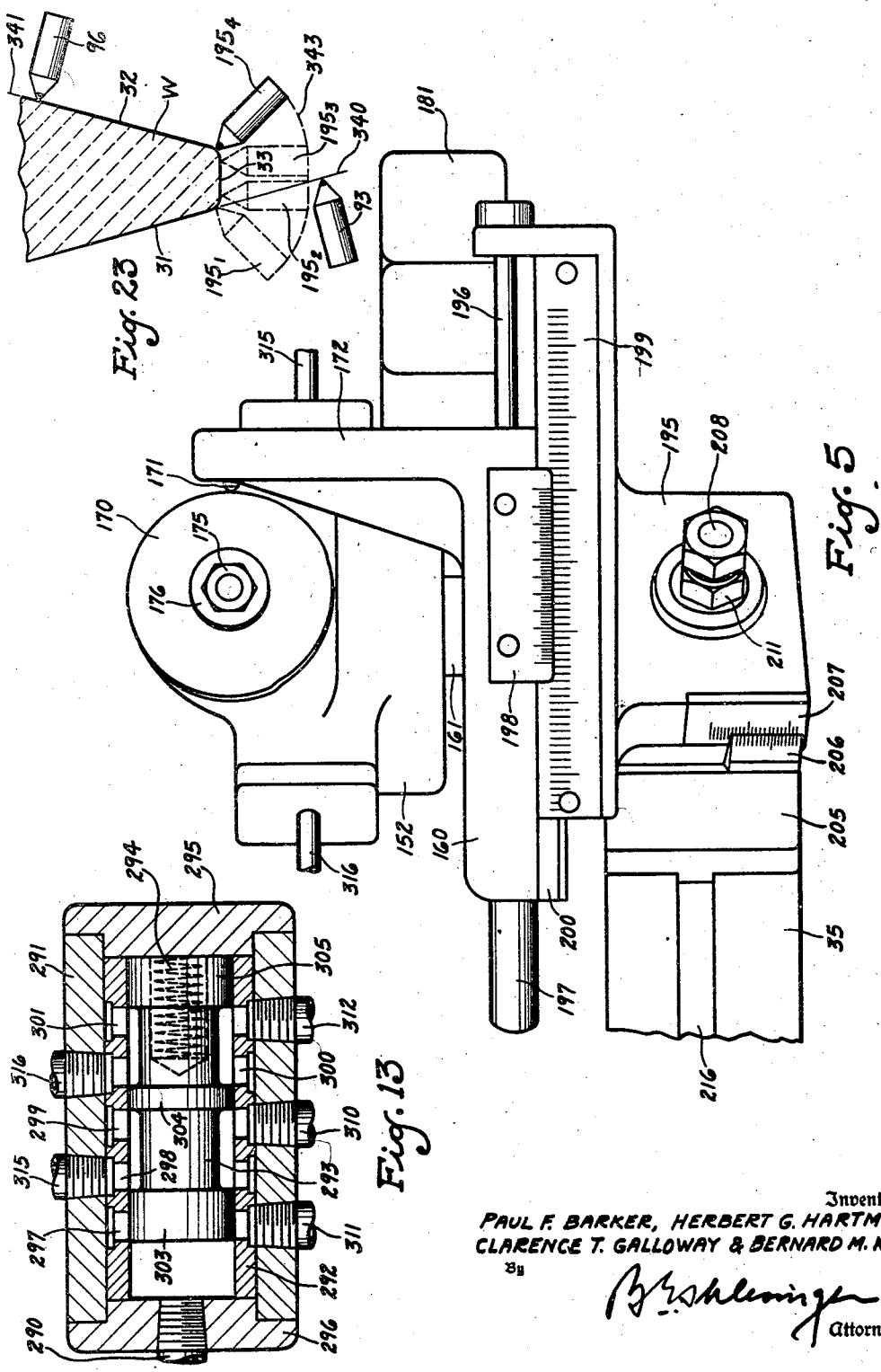

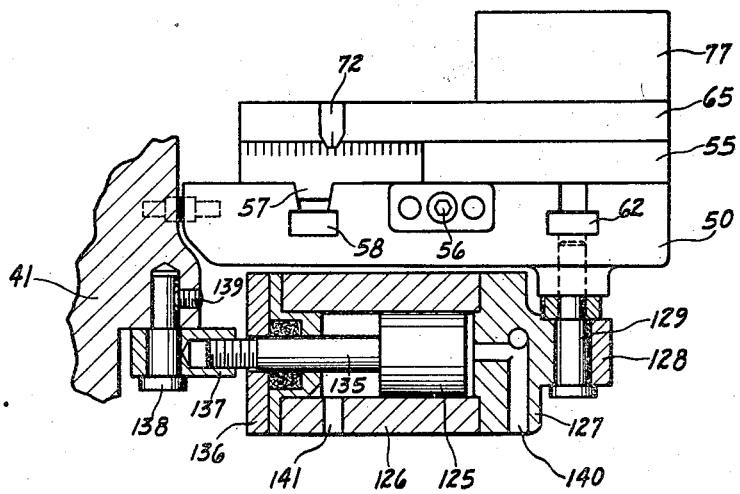
Fig. 9
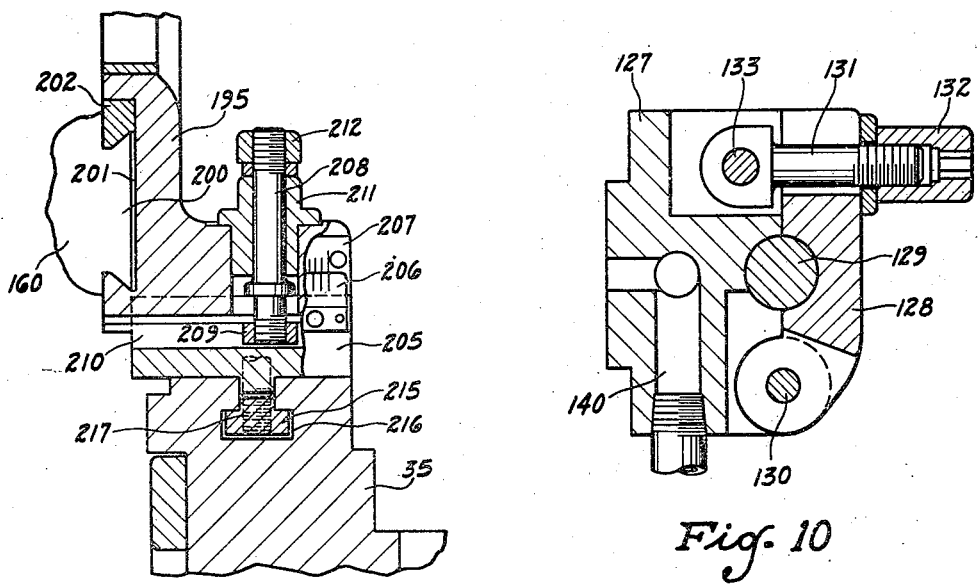
Fig. 6
Fig. 10

Inventor
PAUL F. BARKER, HERBERT G. HARTMAN
CLARENCE T. GALLOWAY & BERNARD M. KUNES
By
Attorney

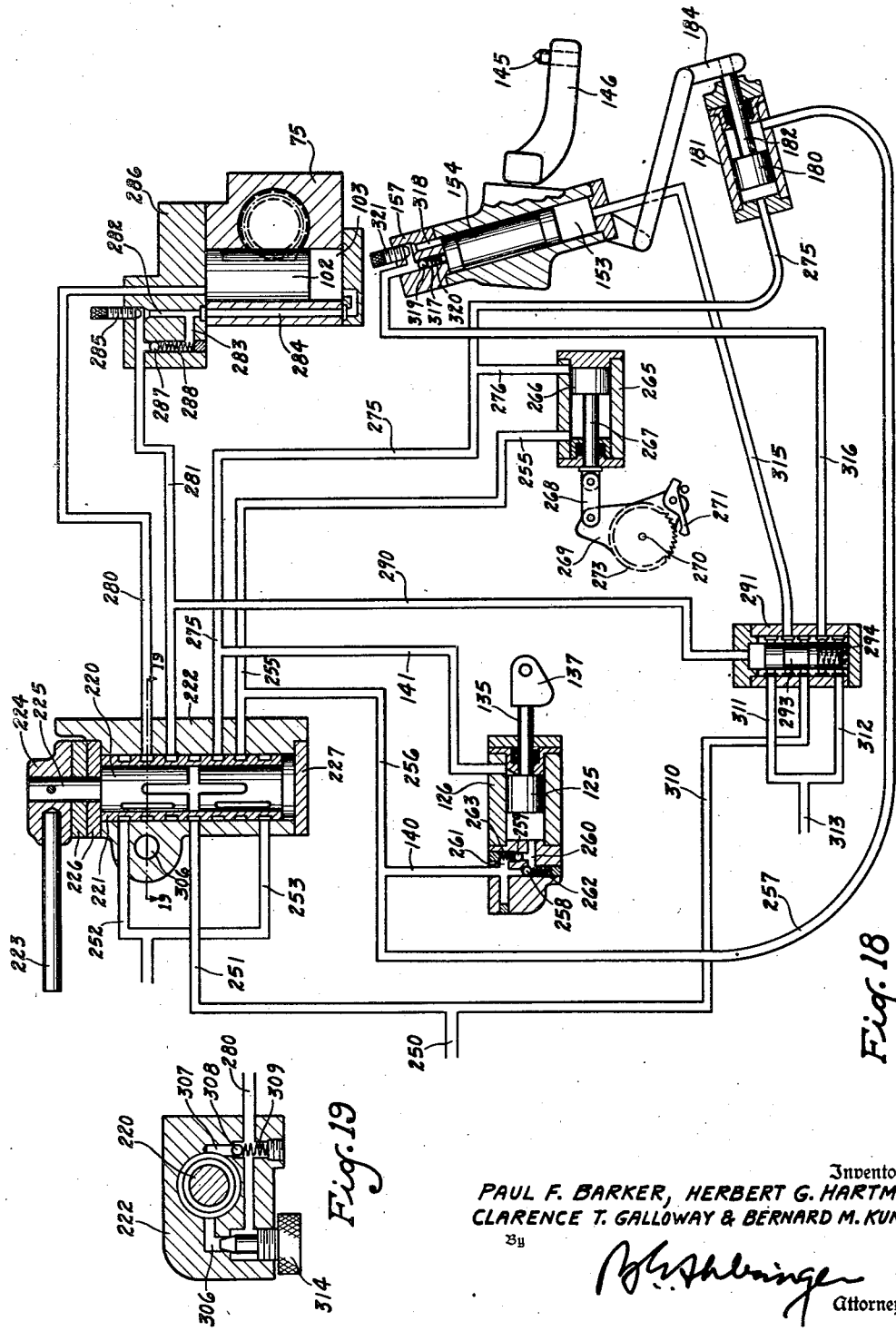

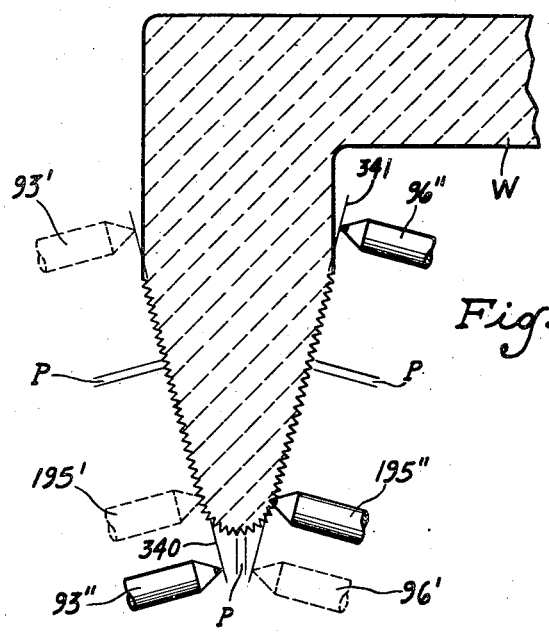
Fig. 20
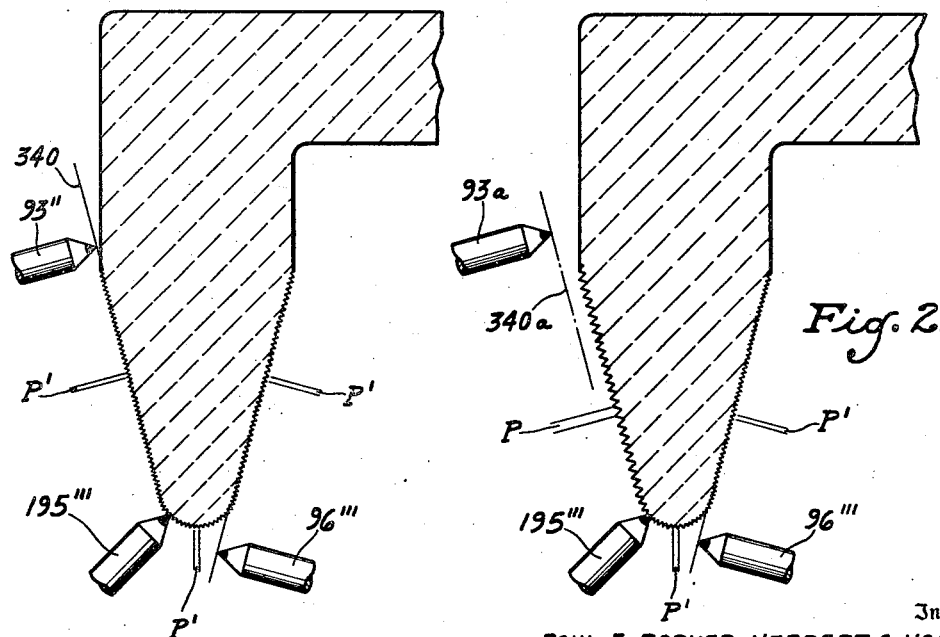
Fig. 21
Fig. 22
Inventor
PAUL F. BARKER, HERBERT G. HARTMAN
CLARENCE T. GALLOWAY & BERNARD M. KUNES
By
Attorney Patented Oct. 15, 1946

2,409,240

UNITED STATES PATENT OFFICE 2,409,240

DRESSING MECHANISM

Paul F. Barker, Herbert G. Hartman, Clarence T. Galloway, and Bernard M. Kunes, Rochester, N. Y., assignors to Gleason Works, Rochester, N. Y., a corporation of New York Application July 28, 1943, Serial No. 496,452

30 Claims. (Cl. 125—11)

The present invention relates to methods and to mechanisms for dressing grinding wheels and particularly to a method and mechanism for dressing wheels that are to be used for grinding gears. In a more specific aspect, the invention relates to methods and apparatus for dressing rotary annular grinding wheels such as are employed in the generating-grinding of spiral bevel and hypoid gears.

In conventional generating-type spiral bevel and hypoid gear-grinders, the grinding wheel is mounted on an oscillatory cradle that is rotated in time with the rotation of the work to produce the generating motion. To grind gears of different spiral angles, the wheel has to be adjusted on the cradle angularly about the cradle axis, and the wheel-dressing mechanism is mounted to be adjustable with the wheel so as to be in operative relation with the wheel in any position of angular adjustment of the wheel. The dressing mechanism is usually mounted to be adjustable around the periphery of the wheel to position it as far as possible away from the work, but even so difficulty has been experienced on some jobs in obtaining sufficient clearance between the dressing mechanism and the work or its support during grinding. This has limited the capacity of the grinders despite the fact that otherwise the machines might be capable of handling a greater range of work.

The dressing mechanism itself consists ordinarily of a pair of side dressers for dressing the inside and outside surfaces of the wheel, respectively, and of a tip dresser for dressing the tip surface of the wheel and the rounds at the junctures of the side surfaces with the tip. In dressing, a diamond, or other hard surfaced tool, is moved across the wheel surface to be dressed while the wheel is rotated on its axis at high speed, usually at the same speed as is employed during grinding. In the dressing operation then, the dressing tool actually turns a helix in the wheel surface being dressed. The lead of this helix, that is, the rate at which the dressing tool is moved across the rotating wheel, determines the finish of the dressed surface. The faster the movement of the dressing tool, the coarser the dressed surface. For a fine surface finish, the dressing tool must be moved at a relatively slow rate.

In the machines heretofore built, the side and tip dressers have been operatively connected together either mechanically or hydraulically so that they perform and complete their dressing operations simultaneously; that is, while a side-dressing tool is moving across one side of the grinding wheel to dress the same, from top to bottom, the other side-dressing tool is moving across the other side of the grinding wheel to dress the same from bottom to top, and the end-dressing tool is moving across the tip of the wheel from one side to the other to dress the tip and to form the desired rounds at the junctures of the sides and the tip. Now the height of the sides of a wheel is greater than the width of the tip of a wheel because the height of the sides of the teeth of a gear is greater than the width of the bottom of its tooth spaces and the wheel, of course, has to be commensurate with the gear to be ground. As a result in conventional types of dressing mechanisms, the tool for dressing the tip of the wheel moves more slowly than the tools for dressing the sides of the wheel. Consequently, the tip-dresser dresses a finer surface on the rounds and on the tip of the wheel than the surfaces dressed on the sides of the wheel by the side dressers.

This is of no consequence in the automotive field, for the bottoms of the tooth spaces of automotive gears and the fillets, which join the bottoms with the sides of the tooth spaces, are not ground. In the aeroplane field, however, gears are heavily loaded, and to eliminate surface cracks which may become points of incipient breakage, the tooth space bottoms and the fillets are ground. We have discovered that if the tip and rounds on a wheel are dressed too fine, the fillets and bottoms of the tooth spaces are likely to be burned when the gears are ground. This is dangerous because a burned surface is a surface already full of cracks and ripe for breakage under load.

We have discovered another factor, also, that must be taken into consideration in the dressing of annular grinding wheels. We have found that where an annular grinding wheel is rotated at high speed the wheel tends to expand under centrifugal force and to press the outside surface of the wheel against the longitudinally concave side of a tooth space being ground thereby with greater pressure than that with which the inside surface of the wheel engages the convex side of that tooth space. As a result, we have further discovered that if the outside surface of the wheel is dressed to the same fineness as is required on the inside surface of the wheel, then the outside surface of the wheel will burn the work, and again disaster may follow.

One object of the present invention is to provide a dressing mechanism in which the side and end dressers are actuated simultaneously but in which the rates of travel of the side and end dressers can be controlled independently of each other.

Another object of the present invention is to provide a method and apparatus for dressing grinding wheels in which the tip surface of the wheel and the rounds, which join the tip with the sides, may be dressed simultaneously with the sides but to a finish sufficiently coarse as not to burn the work.

Another object of the invention is to provide a method and apparatus for dressing grinding wheels with which the tip of the wheel may be dressed to a finish which is no finer than the surfaces dressed on the sides of the wheel.

A further object of the invention is to provide a dressing process and apparatus for dressing annular grinding wheels in which the outside and inside surfaces of the wheel may be dressed to different degrees of finish, the outside surface being dressed to a coarser finish than the inside surface, to compensate for and counteract the effect of centrifugal force on the wheel in use.

Another object of the invention is to dress the sides and tip of a grinding wheel so that it will grind tooth sides and tooth space bottoms on a gear which will have substantially uniform surface finish.

Still another object of the invention is to dress the sides and tip of a grinding wheel so that the wheel can be used to grind gears faster without danger of burning than they can be ground by conventionally dressed wheels.

A further object of the invention is to provide a dressing mechanism having side and tip dressers in which the dressers may be swung away from the grinding wheel on completion of the dressing operations so as to clear the wheel and permit of grinding any gear within the capacity of the machine on which the dressing mechanism is used without danger of interference of the dressing mechanism with the work or its support.

A further object of the invention is to provide a dressing mechanism having separate side and tip dressers in which a single control valve may be employed to control the movements of the side and tip dressers to and from operative position as well as the operation of these dressers when in operative position.

Another object of the invention is to provide a dressing mechanism in which the mechanism for advancing the wheel in accordance with the amount of stock to be dressed off of the wheel is controlled from the same valve which controls the operations of the dressing mechanism itself.

Another object of the invention is to provide a tip dressing mechanism capable of dressing a straight tip surface on a wheel with rounds at the junctures of the tip with the sides of the wheel in a single continuous movement and which will be simpler and cheaper than tip-dressing mechanisms of this character heretofore employed.

A further object of the invention is to provide a dressing mechanism for dressing the sides and tip of a grinding wheel, in which the dressing tools will be moved back and forth across the surfaces to be dressed, and in which the rate of movement of the dressers in one direction will be faster than in the opposite direction, so as to provide first a rough-dressing operation and then a finish-dressing operation.

A still further object of the invention is to provide a dressing mechanism which can be adjusted readily for dressing wheels of various diameters, heights, pressure angles, and profile shapes.

Other objects of the invention will be apparent hereinafter from the specification and from the recital of the appended claims.

The dressing mechanism of the present invention in its preferred form is similar to prior types of dressing mechanisms in that it comprises three swinging arms, one of which carries a diamond for dressing the tip of the wheel and the other two of which carry diamonds for dressing the outside and inside surfaces of the wheel, respectively. The arms, which carry the inside and outside dressers, are actuated, as in prior types of dressing mechanisms, from a single fluid-pressure operated piston which is provided on opposite sides with racks that mesh with spur pinions that are secured to the dresser arms.

The arm, which carries the end dresser, is actuated by a second fluid-pressure operated piston through a rack, which is secured to that piston, and a pinion which is secured to the arm and which meshes with the rack.

The actuating piston for the side dresser arms is mounted in a block which, in turn, is angularly and rectilinearly adjustable on a swingable bracket. The angular adjustment is for positioning the side dressers in accordance with the desired pressure angles of the outside and inside surfaces of the wheel to be dressed. There are two rectilinear adjustments, one in the direction of the wheel axis and the other in a direction at right angles thereto. The first serves to position the mean point of swing of the diamonds with relation to the heights of the active side surfaces of the wheel. The second is for the purpose of positioning the diamonds in accordance with the diameter of the wheel to be dressed. The swingable bracket is pivotally mounted on a slide which is adjustable rectilinearly on a ring-like support in a direction at right angles to the directions of the two previously described rectilinear adjustments, and is for the purpose of positioning the dressing mechanism to dress selectively concave, convex, or substantially straight line profiles on the grinding wheel, in accordance with the principles of Wildhaber et al. Patent No. 2,311,302, issued February 16, 1943. The ring-like support is mounted coaxially with the grinding wheel axis and is adjustable about the axis in accordance with prior practice to permit positioning the dressing mechanism at a point around the grinding wheel remote from the point of engagement of the wheel with the work. The pivotal movement of the bracket on the slide serves, however, to swing the dressers into or out of operative relation with the grinding wheel.

The end dresser arm and the piston, which actuates the same, are pivotally mounted on a slide for movement about an axis that extends at right angles to the axis of swing of this arm. The slide, in turn, is mounted on a bracket for adjustment rectilinearly in two directions at right angles to one another to position the end dresser in accordance with the diameter of the wheel to be dressed and in accordance with the height of the wheel. The bracket itself is adjustable angularly on the ring-like support above mentioned so that like the side-dressers the end dresser may be positioned at a convenient point about the periphery of the wheel to provide maximum clearance between the end dresser and the work.

The pivotal movement of the bracket, which carries the end dresser, serves two purposes, viz., to move the dresser into and out of operative position, and to control the shape produced on the tip surface of the grinding wheel when the dresser is in operative position. In its latter function, the pivotal movement of the bracket serves to swing the dresser, independently of its swinging movement from one side of the wheel to the other, and permits of dressing a plane surface on the tip of the wheel.

The pivotal movements of the brackets, which carry the side and end dressers into and out of operative relation with the wheel, are effected by separate pistons which are controlled from a single valve to operate simultaneously together. This control valve also governs the operation of the pistons which actuate the side and end dressers when the dressers are in operative position.

The control valve is moved step-by-step first in one direction and then in the other. During grinding of a gear, the side and end dressers are out of operative position. When it is desired to dress the grinding wheel, the control valve is moved part-way in one direction to cause the side and end dresser brackets to be swung above their pivots to carry the side and end dressers into operative relation with the wheel. When this position is reached, the control valve is moved the rest of the way in this same direction causing the two pistons, which actuate the dressers, to be moved to effect rough-dressing of the sides, tip and rounds on the wheel by movement of the dressers in one direction across the grinding wheel. The control valve is then moved back one step in the opposite direction, causing the side and end dressers to swing back across the sides and tip of the wheel to effect finish dressing thereof. Then the operator moves the control valve back the second step to its original position, causing the side and end dresser brackets to be moved about their pivots to move the side and end dressers out of operative position to clear the work when the wheel is in use.

Check and throttle valves, which are incorporated in one side of the lines of both the piston, which actuates the side dresser, and the piston, which actuates the end dresser, serve to control the rates of movement of each piston in one direction, so that the pistons may be operated at slower speed during their return movements from that during their forward movements. This permits of rough-dressing on the forward movements and finish-dressing on the return movements. A reversible shuttle valve permits of the movement of the end dresser piston to be independent of the movement of the side dresser piston with the result that the end dresser may be moved at any desired rate with reference to the side dressers in both directions and may produce any desired finish on the tip of the grinding wheel.

A lost motion device, comprising a ball and an inclined raceway for the ball, serves to shift the axial position of the arm which carries the outside dresser, when the arm reverses at the ends of its swing. Thus, the arm may be displaced axially and the outside dresser may clear the wheel on its return stroke. Thus, the outside surface of the wheel may be rough-dressed only to avoid burning of the gear tooth surface which is ground by the outside of the wheel.

To produce feed of the wheel into the dressing tools to compensate for wheel wear, a ratchet and pawl mechanism is provided. This is actuated by a fluid-pressure operated piston which is controlled from the same valve which controls the operation of the other parts of the dressing mechanism. The feed piston is actuated to advance the wheel during swing of the side and end dressers into operative position.

In the drawings:

Fig. 3 is a fragmentary view, partly in elevation and partly in section, on an enlarged scale, showing the end dressing mechanism in operative relation to the grinding wheel;

Fig. 4 is a section on the line 4—4 of Fig. 3 on an enlarged scale, looking in the direction of the arrows;

Fig. 5 is a view of the end dressing mechanism looking in the direction of the arrow 5 in Fig. 3;

Fig. 6 is a fragmentary sectional view showing how the end dressing mechanism is mounted on the supporting ring, which surrounds the grinding wheel spindle, and illustrating some of its adjustments;

Fig. 9 is a view, partly in section and partly in elevation, showing the mechanism for swinging the side-dresser bracket about its pivot and its connection with the bracket;

Fig. 10 is a sectional view on an enlarged scale further illustrating the connection between the side dresser bracket and the piston which swings the bracket to and from operative position;

Figs. 11 and 12 are detail views, taken at right angles to one another, showing the lost-motion connection between the outside dresser arm and the cam which controls the axial movement of that arm;

Fig. 13 is a sectional view of the shuttle valve which permits of operation of the end dressers independently of the side dressers;

Figure 14:
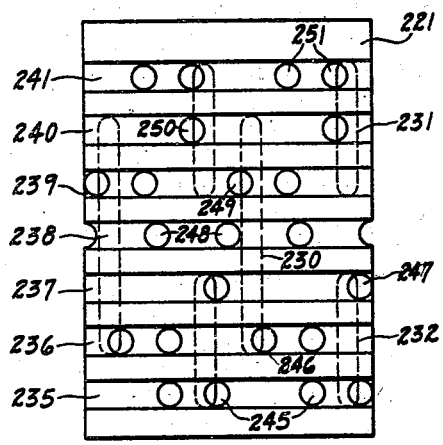
Figure 15:
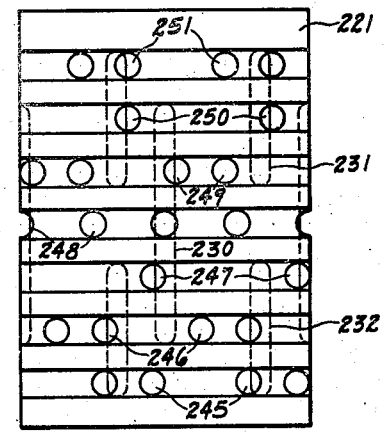
Figure 16:
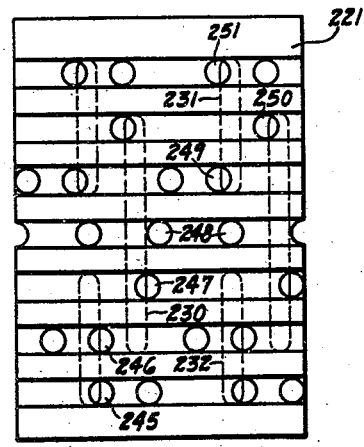
Figure 17:
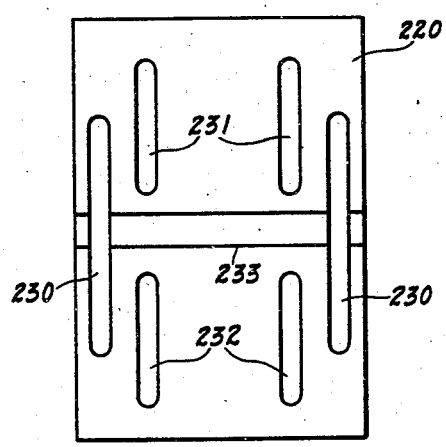

Figs. 14 to 16 inclusive are diagrammatic views illustrating the operation of the valve which controls the operation of the whole dressing mechanism;

Fig. 17 is a developed view of this valve;

Fig. 18 is a diagrammatic view showing the hydraulic circuit to the various parts of the dressing mechanism;

Fig. 19 is a section on the line 19—19 of Fig. 18;

Figs. 20 and 21 are diagrammatic views illustrating the action of the side and end dressers in the successive steps of rough-dressing and finish-dressing, respectively;

Fig. 22 is a view corresponding to Fig. 21 but illustrating diagrammatically the operation when the outside dresser is in withdrawn position on its return stroke; and Fig. 23 is a diagrammatic view illustrating particularly how the tilting movement of the end dresser during a part of its swing from one side of the wheel to the other serves to dress a flat tip surface on the wheel.

Reference will now be had to the drawings for a more detailed description of the invention.

25 (Fig. 2) denotes the tool spindle of a grinding machine of known construction. 26 is a sleeve member in which the tool spindle is journaled. W denotes a grinding wheel which is secured to the tool spindle by, for instance, a clamping disc 27 and a bolt 28. The wheel W is a rotary annular wheel having active outside and inside surfaces 31 and 32, respectively, which are inclined to the axis of the wheel, and a tip surface 33, which ordinarily is perpendicular to said axis. For clearness of illustration, the grinding wheel shown in Fig. 1 is somewhat smaller in diameter than the grinding wheel shown in Fig. 2.

There is a ring member 35 mounted on the flange portion 29 of sleeve 26 behind the grinding wheel. This ring member supports the dressing mechanism and is adapted to be adjusted on the sleeve 26 about the axis of the wheel to position the dressing mechanism at whatever point may be most convenient to clear the work. It is secured in any adjusted position by a hand operated spring-pressed plunger 36 which may be engaged selectively in one of several equi-spaced holes 37 that are formed in the periphery of the flange portion 29 of the sleeve 26.

Figure 1:
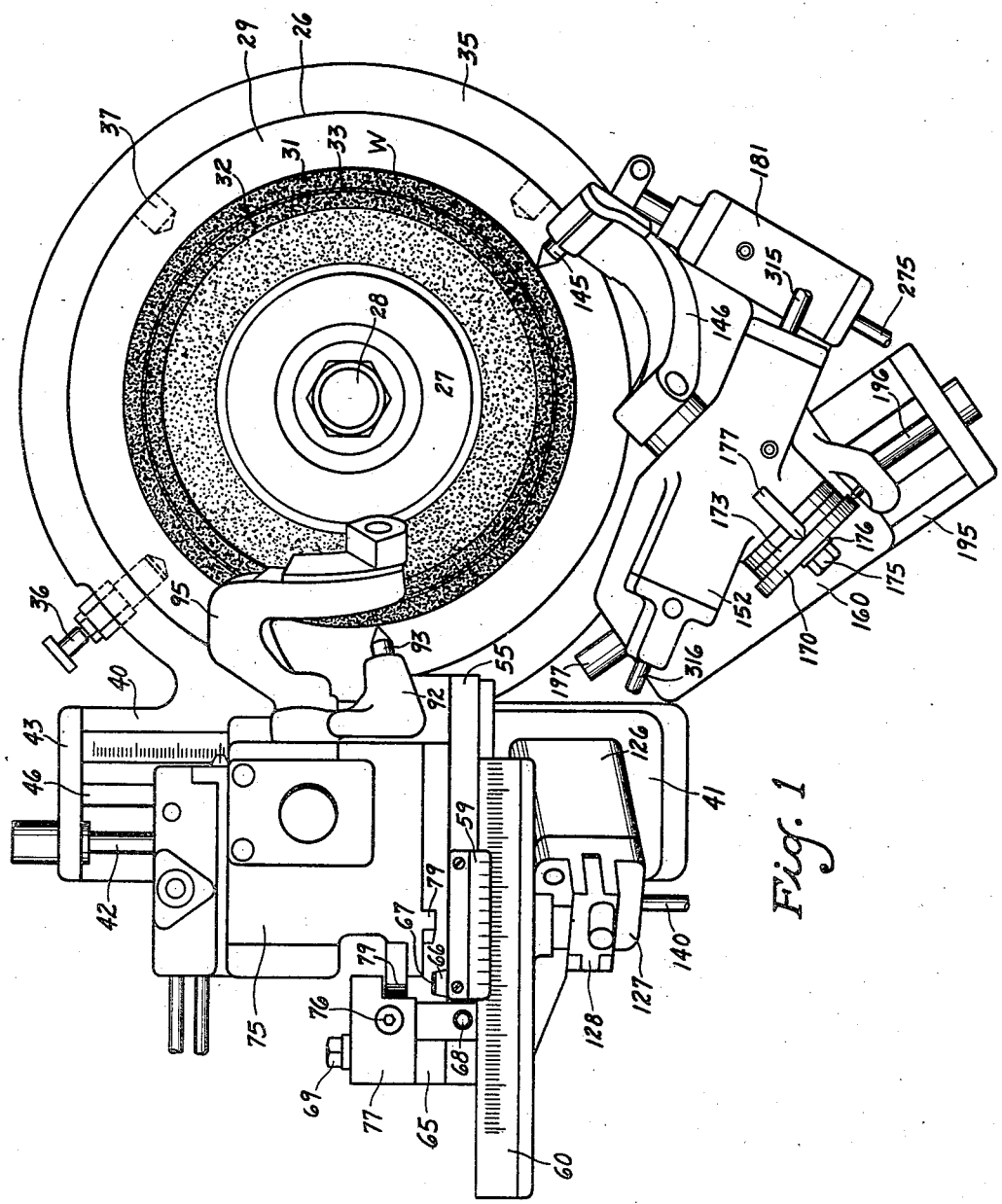
Fig. 1 is an elevational view looking at the wheel end of a spiral bevel gear grinding machine of known construction and showing a dressing mechanism constructed according to one embodiment of the present invention mounted thereon.
Figure 2:
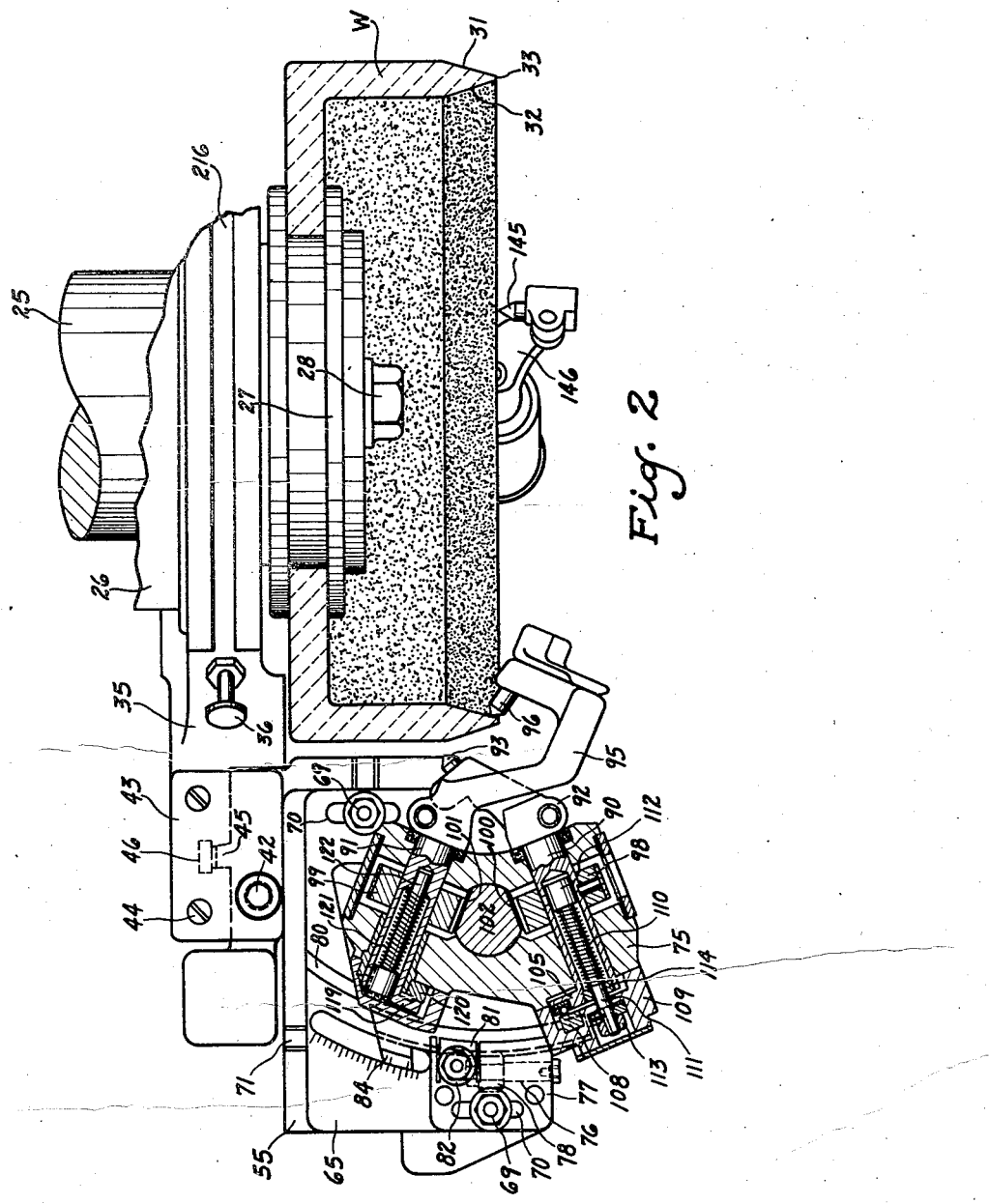
Fig. 2 is a part plan, part transverse sectional view of the parts shown in Fig. 1.
Figure 7:
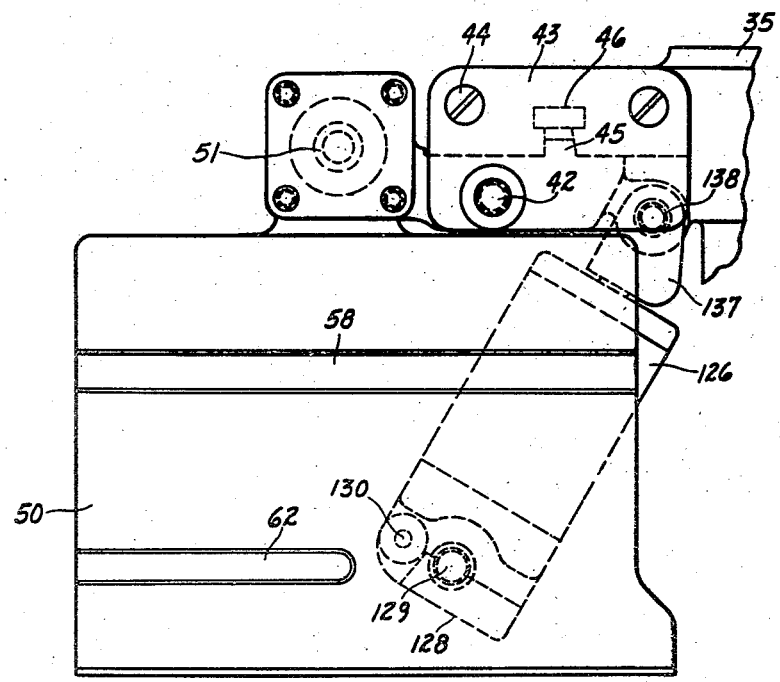
Fig. 7 is a fragmentary view in plan showing the pivotal bracket for carrying the side dressing mechanism, its mounting, and the means for actuating the same.
Figure 8:
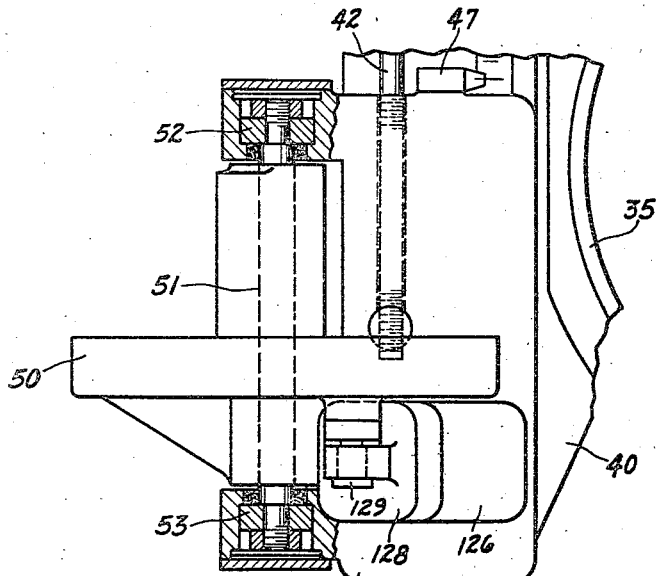
Fig. 8 is an elevational view on a somewhat smaller scale of the parts shown in Fig. 7, portions being broken away and shown in section.

The ring member 35 is formed with a lateral extension 40 on which is mounted a slide 41 (Figs. 1, 7, and 8). The slide 41 is adjustable rectilinearly on the extension 40, and its adjustment is effected by rotation of a screw shaft 42. This shaft is journaled in a plate 43 and threads into the slide 41. The plate 43 is secured to the extension 40 by screws 44 (Fig. 2). The slide 41 is guided in its adjustment by a tongue 45 which engages in a T-slot 46 formed in the front face of the extension 40. An index pointer 47, which is secured to the slide 41 and which reads against graduations enscribed on the face of the projecting portion 40, serves to permit of adjusting the slide precisely. T-bolts (not shown), which engage in the T-slot 46, serve to secure the slide to the ring 35 in any adjusted position.

Pivotally mounted on the slide 41 is a bracket 50. This bracket is hinged to the slide by a hinge pin 51 which is journaled in the slide 41 on bearings 52 and 53. The means for swinging the bracket 50 about the hinge pin 51 will be described hereinafter.

Mounted for rectilinear adjustment on the bracket 50 in a direction at right angles to the direction of adjustment of the slide 41 is a plate 55 (Figs. 1 and 9). Adjustment of this plate may be effected by rotation of the screw shaft 56 which is journaled in the bracket 50 and which threads into a nut (not shown) that is secured to the plate 55. The plate 55 is guided in its adjustment by a tongue 57 which engages in a T-slot 58 formed in the upper face of the bracket 50. A vernier 59, which is secured to the plate 55 (Fig. 1), and a scale 60, which is secured to one side of the bracket 50, serve to permit precise adjustment of the plate 55 on the bracket. The plate is secured to the bracket after adjustment by T-bolts (not shown) which engage in the parallel T-slots 58 and 62 (Fig. 9).

Mounted on the plate 55 for adjustment rectilinearly thereon in a direction at right angles to the directions of adjustment of plate 55 and slide 41 is a plate 65. The plate 65 is guided in its adjustment on the plate 55 by a tongue 66 (Fig. 1) which is integral with the plate 55 and which engages in a groove 67 formed in the under face of the plate 65. Adjustment of the plate 65 on the plate 55 is effected by rotation of a screw shaft 68 which is carried by the plate 65 and which threads into a nut (not shown) that is secured to the plate 55. This adjustment can be effected precisely by use of the pointer 72 (Fig. 9) which is secured to the plate 65 and which reads against graduations enscribed on one side of plate 55. The plate 65 is secured in any position of adjustment on the plate 55 by T-bolts 69 (Fig. 2) which pass through elongated slots 70 in the plate 65 and engage in T-slots 71 formed in the upper face of the plate 55.

Mounted on the plate 65 for angular adjustment thereon is a housing 75 (Figs. 1 and 2). Angular adjustment of this housing is effected by rotation of a worm shaft 76 which is journaled in a block 77 that is doweled or otherwise fastened to the plate 65. The worm shaft 76 carries a worm 78 which meshes with a worm wheel segment 79 that is fastened to the housing 75. The housing 75 is guided in its angular adjustment on the plate 65 by a tongue 79 which is formed on the under face of the housing and which engages in a circular arcuate groove 80 that is formed on the upper face of the plate 65. A flexible tongue 81, which is integral with the block 77 and which is manipulated by the bolt 82 and which engages over an arcuate flange formed integral with the housing 75, serves to clamp the housing in any adjusted position. A vernier 84, that is integral with the housing 75 and that reads against angular graduations provided on the upper face of the plate 65, serves to permit of adjusting the housing 75 precisely angularly on the plate 65.

Journaled on suitable anti-friction bearings in the housing 75 are a pair of shafts 90 and 91 (Fig. 2). These shafts are mounted in the housing so that their axes are inclined to one another at an angle corresponding to the included angle between the inside and outside surfaces 31 and 32 of the grinding wheel which is to be dressed. The shaft 90 carries an arm 92 in which is mounted the diamond 93 for dressing the outside surface 31 of the grinding wheel. The shaft 91 carries an arm 95 in which is mounted the diamond 96 for dressing the inside surface 32 of the grinding wheel. The arms 92 and 95 are shaped in the conventional manner so that at a mean point of swing of the arm 95 the diamond 96 will engage the inside surface 32 of the wheel at a point lying in the same radial plane of the wheel as the point of engagement of the diamond 93 with the outside surface of the wheel when the arm 92 is at a mean point of its swing. Further, the arms 92 and 95 are shaped and bent in the usual manner and the diamonds 93 and 96, respectively, are so mounted in these arms that each diamond will lie at substantially right angles to the side surface which it is to dress.

There is a spur gear segment 98 fastened to the shaft 90 and there is a spur gear segment 99 fastened to the shaft 91. These segments mesh with racks 100 and 101, respectively, that are cut into opposite sides of a piston 102. The piston 102 is reciprocable in a cylinder 103 (Fig. 18) formed in the housing 75.

The end of the shaft 90, remote from that which carries the arm 92, is formed with an integral arm 105 (Figs. 2, 11 and 12). This arm carries a ball 106 which serves as a follower to engage the face 107 of a cam 108 that is secured in an end plate 109 which is fastened in any suitable manner to the housing 75.

A coil spring 110, which surrounds a plunger 111, serves to hold the ball-follower 106 against the face 107 of the cam. The plunger is mounted in a hole drilled in the shaft 90 and the spring 110 is interposed between the head 112 of the plunger and a nut 114 which threads into the bore of the shaft 90. The plunger 111 is secured in the housing 75 by a nut 113 which threads onto the outer end of the plunger.

The ball 106 is mounted in a raceway 115 (Fig. 11) whose internal diameter is somewhat larger than the diameter of the ball, and the ball is adapted to ride on the inclined surface 116 of a block 117 which is mounted in the arm 105. The surface 116 is inclined in the direction of rotation of the shaft 90 so that when the shaft is reversed at the ends of its swing the ball 106 may ride on the surface 116 to allow of axial movement of the shaft. The ball and its mounting constitute, therefore, a lost motion device allowing axial movement of the shaft 90 for a purpose which will hereinafter appear in more detail.

The shaft 91 has an arm 119 (Fig. 2) formed integral with it which is adapted to ride on the rear face of a cam 120 that is secured to the housing 75. The arm 119 is held in engagement with the cam 120 by a coil spring 121 which surrounds the plunger 122. This spring is interposed between the head of the plunger and the shaft 91.

The cams 108 and 120 control the profile shapes dressed on the outside and inside surfaces, respectively, of the grinding wheel. The configurations of the active surfaces of these cams determine directly the profile shapes dressed on the wheel. Thus the active surface 107 of cam 108 (Figs. 11 and 12) comprises a plane surface 123 perpendicular to the axis of the shaft 90 and an inclined surface 124. Hence, the cam 108 will cause the dressing tool 93 to dress a surface on the outside of the wheel of two different pressure angles in accordance with the principles of Stewart Patent No. 2,311,262. If it is desired to dress a straight profile of a single pressure angle from top to bottom, a plane surfaced disc is substituted for the cam 108 so that no axial motion, other than that produced by the lost motion device, is imparted to the shaft 90 during dressing.

From the structure described, it will be seen that when the piston 102 is moved in one direction or the other in the housing 75, the arms 90 and 91 will be swung simultaneously in opposite directions to pass the dressing tools 93 and 96 across the outside and inside surfaces, respectively, of the grinding wheel and that during the swinging movements of the arms, axial movements may also be imparted to them depending upon the shapes of the cams 108 and 120, and also, in the case of the shaft 90, upon the lost motion device 106—116. Thus by use of suitable cams 108 and 120 any desired shapes can be dressed on the outside and inside surfaces of the grinding wheel, and through the lost motion device, the outside dressing diamond can be moved clear of the outside surface of the wheel on the return stroke of the arm 92 so as to dress on movement of this arm in one direction only.

As has already been stated, bracket 50 is pivotally mounted upon the slide 41 (Figs. 7 and 8). The pivotal movement of the bracket is for the purpose of swinging the side dressers into and out of operative engagement with the grinding wheel. The pivotal movement of the bracket is produced by a piston 125 (Figs. 9 and 18) which is mounted to reciprocate in a cylinder 126. One end of this cylinder is closed by an end cap 127 (Figs. 9 and 10) which is secured by screws (not shown) to the cylinder. This end cap is releasably secured to the bracket 50 by means of a keeper 128 which engages a headed pin 129 that is secured by a pressed fit or otherwise in the bracket. The keeper 128 is pivotally connected to the end cap 127 by means of the hinge pin 130 and it is secured in engagement with the pin 129 by the hinge bolt 131 and the nut 132. The hinge bolt 131 is pivoted on the cover plate 127 by means of the pin 133, and the nut 132 threads onto the hinge bolt 131 to hold the keeper 128 in engagement with pin 129.

The piston 125 is fixed against movement relative to the slide 41. It has a rod portion 135 which projects through the end cap 136 of the cylinder 126 and which threads into a block 137 that is pivotally mounted on a pin 138. The pin 138 is secured in the slide 41 against movement relative thereto by a set screw 139.

Ducts 140 and 141 are provided in the end plate 127 and the side wall of the cylinder 126, respectively, for admitting fluid under pressure to opposite ends of the piston 125. When the line 140 is on pressure, the bracket 50 will be swung about the hinge pin 51 (Figs. 7 and 8) to move the side-dressing mechanism out of operative relation with the grinding wheel, and when the duct 141 is on pressure, the side dressing mechanism will be returned again into operative relation with the wheel.

The tip surface of the wheel is dressed by a diamond 145 (Figs. 1 and 2) which is secured in an arm 146 that has a split-clamp connection with a shaft 147 (Fig. 3) and that is held against axial movement relative to this shaft by means of the washer 148. This washer is secured to the shaft by a screw 149. The shaft 147 is journaled on suitable bearings 150 and 151 in the housing 152. This housing is bored to provide a cylinder 153 (Figs. 4 and 18) in which there is reciprocably mounted a piston 154. The piston 154 is provided at one side with rack teeth 155 that mesh with the teeth of the spur pinion 156 which is keyed to the shaft 147. Thus, as the piston 154 is reciprocated in the cylinder 153, the shaft 147 is rocked in one direction or the other to move the diamond 145 across the tip of the grinding wheel from one side thereof to the other to dress the tip of the wheel and rounds at the junctures of the tip with the sides of the wheel.

The housing 152 is mounted to swivel on a slide 160 for movement about an axis which extends in a direction perpendicular to the axis of oscillation of the shaft 147. For this purpose, there is a swivel stud 161 secured in the slide 160 by a nut 162 which threads onto the lower end of the stud. The housing 152 is mounted on the stud 161 by a circular collar 163 which engages under the enlarged head portion 165 of the stud and which is secured to the housing 152 by the screws 166. A spacing washer 167 is interposed between the collar 163 and the housing 152.

The housing 152 may be oscillated about the axis of the centering member 161 for two purposes, namely, to produce a substantially flat tip surface on the grinding wheel as the end dresser 145 swings from one side to the other of the wheel, and to move the end dresser 145 out of or into operative relation with the wheel. The first movement is accomplished by means of a cam 170 (Figs. 3 and 5) which engages with a rider or follower 171. The cam is mounted for rotatable adjustment on a disc 173 that is keyed to the shaft 147. The rider or follower 171 is in the form of a pin which is threaded into an upright arm 172, that is integral with the slide 160. The follower has a conical inner end that engages the peripheral surface of the cam 170. The cam is secured against rotation relative to the disc 173 by a nut 175 and washer 176. The nut 175 threads on the shaft 147. The adjustment of the cam on the disc permits of controlling the angle of inclination to the axis of the grinding wheel of the tip surface dressed on the wheel. By adjusting the cam angularly about the axis of shaft 147, the point, at which the housing 152 is rocked by the cam, can be adjusted, so that the plane tip surface dressed on the wheel can be made perpendicular to the axis of the wheel or can be inclined thereto at any suitable angle. Ordinarily the tip of the wheel is dressed to be perpendicular to a line bisecting the angle between opposite sides of the wheel. Adjustment of the cam 170 on disc 173 can be made precisely by use of the pointer 177 (Fig. 1) which reads against suitable graduations provided on the periphery of the cam.

The swivel movement of the housing 152 for movement of the end dresser to and from operative position is effected by reciprocation of a piston 180 (Figs. 3 and 18) that is reciprocable in a cylinder 181 which is integral with the slide 160. The piston 180 is formed with a rod portion 182 which projects through the end plate 183 of the cylinder 181 and which has a threaded and split clamp connection with a coupling piece 184. This coupling piece 184 has a pivoted connection at 185 with a piece 186 into which is threaded a plunger 187. The plunger 187 extends into a sleeve 188 which is pivotally connected by means of the pin 189 (Figs. 3 and 4) with the housing 152. The pin 189 threads into the housing 152. There is a coil spring 190 that surrounds the plunger 187 and that is interposed between the head of the plunger and a cap 191 which threads into the open end of the sleeve 188. The spring tends to hold the end dresser in operative position in combination with the pressure on the right hand end of the piston 180 (Fig. 3). When pressure is applied to the left hand end of the piston 180, however, the end-dressing mechanism is swung about the pivot stud 161 so that it is moved away from operative relation with the grinding wheel.

The slide 160 has a dove-tailed portion 200 which engages in a correspondingly shaped groove 201 in the bracket 195, and is mounted for rectilinear adjustment on a bracket 195 (Figs. 3, 5, and 6). A gib 202 serves to take up wear. The adjustment of the slide is effected by rotation of a screw shaft 196 which is journaled in the bracket 195 and which threads into a nut (not shown) that is secured in the slide. A tubular guard 197, that is secured to the slide, serves to protect the threaded portion of this shaft from dirt and grit. The adjustment of slide 160 on the bracket 195 is provided to permit of proper positioning of the end dresser in accordance with the diameter of the grinding wheel to be dressed. This adjustment can be made precisely through use of the vernier 198 which is secured to the slide 160 and which reads against a graduated scale 199 that is fastened to the bracket 195.

The bracket 195 is adjustable rectilinearly on a plate 205. This adjustment, which is in a direction at right angles to the direction of adjustment of the slide 160 on the bracket 195, is for the purpose of positioning the end dresser in accordance with the height of the grinding wheel, that is, in accordance with the axial position of the tip surface of the wheel. It may be effected manually under control of a vernier 206 which is secured to the plate 205 and which reads against a scale 207 that is fastened to the bracket 195. After the adjustment is made, the bracket 195 is fastened to the plate 205 by means of the bolt 208 that threads into a nut 209 which engages in a slot 210 formed in the upper face of the plate 205. The bolt 208 is mounted in the thimble 211 which is flanged to engage the bracket 195. A lock-nut 212 serves to hold the bolt securely after the adjustment is made.

The plate 205 is mounted on the ring member 35 for adjustment around the periphery of the ring member about the axis of the wheel spindle. This adjustment permits of positioning the end dresser at any convenient point around the periphery of the grinding wheel so as to minimize the possibility of interference between the end-dressing mechanism and the work even in withdrawn position of the end-dressing mechanism. The plate 205 is secured in any adjusted position on the ring member 35 by two T-shaped tongues 215 (Figs. 3 and 6) which engage in a T-shaped groove 216 formed on the periphery of the ring 35 and which serve to guide the plate 205 in its adjustment on the ring. Bolts 217, which are carried by plate 205, serve to move the tongues 215 into and out of clamping position.

The operation of the dressing mechanism shown in the drawings is controlled by a manually rotatable valve 220 (Figs. 17 and 18) which is journaled in the sleeve 221 that is mounted in the bracket 222. The bracket 222 is secured in any suitable position on the grinding machine. The valve 220 is rotated by a lever 223 which is secured in a head 224 that is pinned to the stem portion 225 of the valve 220. The stem portion 225 of the valve projects outwardly through the plates 226 that close one end of the casing 222. The opposite end of the casing is closed by a plate 227.

The valve is formed on its periphery with two elongated grooves 230 and with two pairs of shorter grooves 231 and 232. All of these grooves extend axially of the valve. The grooves 230 are connected, however, by a groove 233 which extends around the periphery of the valve.

The sleeve 221 (Figs. 14, 15, 16 and 18) is provided with seven peripheral grooves 235 to 241 inclusive which are equi-spaced axially of the sleeve. Radial ports, which are drilled in the sleeve 221, communicate with each of these grooves. Thus, there are four ports 245, communicating with groove 235; there are four ports 246, communicating with groove 236; two ports 247, communicating with groove 237; four ports 248, communicating with groove 238; four ports 249, communicating with groove 239; two ports 250, communicating with groove 240; and four ports 251, communicating with groove 241. The different ports of each group are spaced angularly from one another about the axis of the sleeve 221 and valve 220 as best shown in the developed views of Figs. 14 to 16 inclusive. The shoulders formed on the sleeve 221 between the several grooves 235 to 241 inclusive separate the different groups of ports from one another so that the motive fluid may flow from one group of ports to another only through the grooves 230, 231, 232, and 233 of the valve 220.

The pressure fluid is supplied to the valve 220 from ducts 250 and 251 (Fig. 18). The duct 250 is connected with any suitable source of fluid supply. The duct 251 communicates with the groove 238 and ports 248 in sleeve 221. The motive fluid is exhausted from the valve 220 through the ducts 252 and 253. The duct 252 communicates with the valve through the groove 241 and ports 251 of sleeve 221, and the duct 253 communicates with the valve through the groove 235 and ports 245 of sleeve 221.

The groove 236 and ports 246 in the sleeve 221 communicate with a duct 255. This duct is connected by means of a duct 256 and a duct 257 with one end of the cylinder 181 in which the piston 180 reciprocates that moves the end-dressing mechanism to and from operative position. The duct 255 is also connected by means of the duct 256 and duct 140 with one end of the cylinder 126 in which the piston 125 reciprocates that moves the side-dressing mechanism to and from operative position. The connection between the duct 140 and the cylinder 126 is controlled by two ball check valves 258 and 259. The ball check valve 258 is normally constrained by a coil spring 262 to prevent flow of the motive fluid from the duct 140 into the duct 260 whence it may flow into the cylinder 126. The ball check valve 259 is normally constrained by the coil spring 263 to prevent flow of the motive fluid from the cylinder 126 through the ducts 260 and 261 into the duct 140.

The duct 255 is also connected with one end of a cylinder 265 in which a piston 266 is reciprocably mounted. The piston 266 is intended to operate the mechanism for feeding the grinding wheel into the dressers to determine the amount of stock to be removed from the wheel and to compensate for wear of the wheel. The piston 266 may be connected to the feed mechanism of the grinding machine in any suitable manner to operate same. As shown, it is connected by the piston rod 267 and a link 268 with one arm of an oscillatable member 269 that is mounted to pivot about an axis 270. Pivotally mounted on another arm of the member 269 is a pawl 271 which is adapted to engage a ratchet wheel 272 that is mounted to rotate about the axis 270. This ratchet wheel may be connected, for instance, to a feed screw that imparts feed movement to the grinding wheel so that on each reciprocation of the piston 266 a step-by-step feed movement may be imparted to the wheel to feed the wheel into the dressers.

The groove 237 and ports 247 in the sleeve 221 communicate with a duct 275 which is connected to one end of the cylinder 181 in which the piston 180 reciprocates. This duct 275 is also connected with one end of the cylinder 126 by the duct 141, and it is connected with one end of the cylinder 265 by the duct 276.

The groove 240 and ports 250 in the sleeve 221 communicate at opposite sides of the sleeve 221 with ducts 306 and 307 (Fig. 19). A ball check valve 308 is normally pressed by a coil spring 309 into position to close off communication between the duct 307 and a duct 280. A needle valve 314, which threads into the valve casing 222, serves to control the opening between the duct 280 and the duct 306. The duct 280 leads to one end of the cylinder 103 in which the piston 102, that actuates the side dressers, reciprocates. The opposite end of the cylinder is connected by the duct 281 with the groove 239 and ports 249 in the sleeve 221.

The duct 281 also communicates with the cylinder 103 either through the duct 282 or the duct 283. Both of these ducts connect with a duct 284 which leads to the lower end of cylinder 103. The connection between the duct 282 and the duct 281 is controlled by needle valve 285 which is adjustably threaded into a cap member 286 that is secured in any suitable manner to the housing 75 and that serves to close one end of cylinder 103. Communication between the duct 281 and the duct 283 is normally closed by a ball check valve 287 under actuation of the spring 288.

The duct 281 is also connected by a duct 290 with one end of a chamber or casing 291 (Figs. 13 and 18) which houses the sleeve 292 and the valve 293 that reciprocates therein. The valve 293 is normally urged in one direction by a coil spring 294 which is housed in a bore in the valve and which is interposed between the inner end of this bore and the cap member 295 which closes one end of the valve chamber. The duct 290 is threaded into the cap member 296 which closes the other end of the valve chamber. The sleeve 292 is formed with five groups of radial ports. These ports are denoted at 297, 298, 299, 300 and 301, respectively. The valve 293 is formed with three axially spaced partition shoulders 303, 304 and 305.

The valve 293 is a shuttle valve and serves in the embodiment of the invention illustrated in the drawings to permit of movement of the end dresser independently of the side dressers. The pressure fluid is supplied to the valve 293 from the line 250 through the duct 310 which communicates with the ports 299 in the sleeve 292. The motive fluid is exhausted from the valve chamber 291 either through the duct 311, which communicates with the ports 297 in sleeve 292, or the duct 312, which communicates with the ports 301. The two ducts 311 and 312 are connected to a duct 313 which leads to the sump of the grinding machine.

The valve chamber 291 is connected to one end of the cylinder 153, in which the piston 154 reciprocates, by a duct 315 which communicates with the ports 298 in the sleeve 292. The valve chamber 291 is connected to the opposite end of the cylinder 153 through a duct 316 which communicates with the ports 300 in the sleeve 292. The duct 316 connects with the mentioned end of the cylinder 153 either through a duct 317 or a duct 318. Communication between the duct 316 and the duct 317 is controlled by a normally closed ball-check valve 319 that is urged into closed position by a coil spring 320. Communication between the duct 318 and the duct 316 is controlled by a needle-valve 321 which threads into the cap member 157 that closes one end of the cylinder 153.

The parts are shown in Fig. 18 in the positions which they occupy when the side and end-dressing mechanisms are out of operative position. This corresponds to the position of the valve 220 which is diagrammatically illustrated in Fig. 14. In this figure and in Figs. 15 and 16 the grooves in the valve body are shown in dotted lines opposite the ports of the valve sleeve 221 with which the grooves are in communication at different steps in the rotary movement of the valve. Figs. 14, 15 and 16 represent successive positions of the valve as it is rotated in the sleeve.

In the position of the valve shown in Figs. 14 and 18, the pressure fluid flows from the ducts 250 and 251 through the ports 248, grooves 230 and 233, and ports 246 and 249 into the ducts 255 and 281. At the same time, the duct 275 is on exhaust through the ports 247, grooves 232, and ports 245, while the duct 280 is on exhaust through the needle valve 314 (Fig. 19) duct 306, ports 250 in the sleeve 221, grooves 231 in the valve body 220, and ports 251 in the valve sleeve 221.

The pressure fluid flowing into the duct 255 holds the piston 180 to the left in the position shown in Fig. 18, holding the end-dressing mechanism in inoperative position. The pressure fluid flowing through the duct 255 also holds the piston 266, which controls the feed of the grinding wheel, at the right end of the cylinder 265 with the pawl 271 in reset position. The pressure-fluid also flowing through the duct 255 into the ducts 256 and 140 forces the ball-check valve 258 open against the resistance of the spring 262, but closes the ball-check valve 259. Thus it flows into the cylinder 126 through the duct 260 to hold the piston 125 at the right hand position shown in Fig. 18, holding the side-dressing mechanism in inoperative position.

In the described position of valve 220, the pistons 102 and 154, which operate the side and end dressers, respectively, remain at the upper ends of their cylinders 103 and 153, respectively, in the positions shown in Fig. 18, for the pressure fluid flowing through the line 281 enters the lower end of the cylinder 103 through the open ball-check valve 287 and the ducts 283 and 284, while the shuttle valve 293 is held in its lowermost position in the valve chamber 291 through flow of the pressure fluid from the ducts 281 and 290 into the upper end of the valve chamber 291. With the valve 293 in its lowermost position, the pressure-fluid flows from the duct 310, through the ports 299 and 298 of sleeve 292 into the duct 315 to the lower end of the cylinder 153, while the upper end of this cylinder is on exhaust through the duct 318, throttle valve 157, duct 316, ports 300 and 301 of sleeve 292, and ducts 312 and 313.

When the operator wishes to effect dressing of the grinding wheel, he rotates the valve 220 by the handle 223 to move the valve to the first position indicated diagrammatically in Fig. 15. This reverses the direction of flow of the motive fluid through the lines 255 and 275, while maintaining the previous direction of flow of the motive fluid through the lines 281 and 280. Thus the line 275 is put on supply through the ports 248, grooves 230 and 233, and ports 247, while the line 255 is put on exhaust through the ports 246, grooves 232, and ports 245.

With the line 275 on supply and the line 255 on exhaust, the pressure-fluid forces the piston 180 to the right in the cylinder 181 from the position shown in Fig. 18, the right hand end of the cylinder 181 exhausting through the lines 257, 256 and 255. Thus, the end-dressing mechanism is swung into operative position through the connection of the piston-rod 182 (Figs. 3 and 4) with the housing 152 which carries the end-dressing mechanism. With the line 275 on supply and the line 255 on exhaust, the piston 125 is also forced to the left in the cylinder 126 from the position shown in Fig. 18, thus causing the side-dressing mechanism to be swung also about the hinge 51 (Figs. 7 and 8) into operative position through the connection of the piston-rod 135 with the slide 41 (Fig. 9) which supports the side-dressing mechanism. At this time the exhaust fluid flows from the left-hand end of the cylinder 126 through the duct 260, the now-open ball-check valve 259, and the lines 140 and 256 into line 255.

With the line 275 on supply and the line 255 on exhaust, the piston 266 is also actuated, being shifted to the left from the position shown in Fig. 18. This causes the pawl 271 to rotate the ratchet wheel 273 actuating the wheel-feed mechanism of the grinding machine, thereby feeding the grinding wheel into the dressers in accordance with the amount of stock which it is desired to dress off the wheel in the subsequent dressing operation.

During the described movements of the side and end-dressing mechanisms into operative position and feed of the grinding wheel, the pistons 102 and 154, which operate the side and end dressers, respectively, remain at the upper ends of their cylinders 103 and 153 in the positions shown in Fig. 18, for the line 281 remains on supply and the line 280 remains on exhaust.

With the side and end dressers in operative position, the operator rotates the valve 220 still further to the position shown diagrammatically in Fig. 16. This puts the line 280 on supply through the ports 248, grooves 230 and 233, ports 250, and ducts 306 and 307 (Fig. 19), while the line 281 is put on exhaust through the ports 239, grooves 231 and ports 251. At the same time, the line 275 remains on supply and the line 255 on exhaust, thus keeping the dressing mechanisms in their operative positions.

With the line 280 on supply, the pressure-fluid flows into the upper end of the cylinder 103 forcing the piston 102 downwardly in the cylinder 103 from the position shown in Fig. 18, causing the side dresser arms 92 and 95 to be swung in one direction to rough-dress the outside and inside surfaces of the grinding wheel. At this time, the lower end of the cylinder 103 is on exhaust through the duct 284 and needle-valve 285.

With the line 281 on exhaust, the line 290 is also on exhaust. Hence, the spring 294 forces the shuttle valve 293 upwardly in the valve chamber 291 from the position shown in Fig. 18. Thus the line 316 is put on supply from the line 310 through the ports 299 and 300 of sleeve 292 (Fig. 13), and the line 315 is put on exhaust through the ports 298 and 297 of sleeve 292, and lines 311 and 313. Thus, the piston 154 is forced downwardly in the cylinder 153, causing the end dresser to swing in one direction about the axis of its shaft 147 (Fig. 3) to effect rough-dressing of the tip of the grinding wheel.

It will be noted that the rough-dressing movement of the end-dresser is unthrottled, and hence the end-dresser sweeps over the rounds and tip of the wheel at the rapid rate induced by full pressure of the motive fluid on the piston 154. The rough-dressing movement of the side dressers may be limited, however, by the setting of the throttle valve 285. The relative rates of the rough-dressing movements of side and end dressers may, therefore, be adjusted as desired.

The operator now reverses the direction of rotation of the valve 220, moving the valve back from the position shown diagrammatically in Fig. 16 to that shown diagrammatically in Fig. 15. This again places the line 281 on supply and the line 280 on exhaust while maintaining the lines 275 and 255 on supply and exhaust, respectively. With the line 281 on supply, the motive fluid flows through the ball-check valve 287 and ducts 282, 288, 283, and 284 to the lower end of the cylinder 103 forcing the piston 102 upwardly in the cylinder to the position shown in Fig. 18, causing the side dressers to be swung back across the grinding wheel. During this return movement, the motive fluid exhausting from the upper end of the cylinder 103 through the duct 282 is throttled by the throttle valve 314, for at this stage the ball-check valve 308 is closed by operation of the spring 309 and by the pressure of the exhaust fluid on the ball. Thus, the rate of the return or finish-dressing movement of the side dressers is controlled by the setting of the throttle valve 314.

With the line 281 on supply, the line 290 is put on supply also, causing the valve 293 to be forced downwardly in the valve chamber 291, putting the line 315 again on supply from the line 310 and putting the line 316 again on exhaust through the line 312. This causes the piston 154 to be forced upwardly in the cylinder 153 back to the position shown in Fig. 18, causing the end-dressing diamond 145 to be swung in its return or finish-dressing movement across the tip of the grinding wheel. In this return movement, the upper end of the cylinder 153 is on exhaust through the duct 318 and the throttle valve 321, for the spring 317 and the pressure of the exhaust fluid close the ball-check valve 319. Thus, the rate of the return or finish-dressing movement of the end dresser may be controlled by the setting of the throttle valve 321. It will be noted, therefore, that the throttle valves 314 and 321 permit of adjusting separately the rates of finish-dressing movements of the side and end dressers.

The operator now rotates the valve 220 back on to the position shown in Fig. 14. This keeps the lines 281 and 280 on exhaust and supply, respectively, holding the pistons 102 and 154 in starting positions, but it puts the line 255 on supply and the line 275 on exhaust. This causes the piston 180 to be moved back to the left and the pistons 125 and 266 to be moved back to the right to the positions shown in Fig. 18. The piston 180 is moved back to the left by flow of the pressure-fluid from the line 255 through the ducts 256 and 257, the motive fluid exhausting from the left hand end of cylinder 181 through the duct 275. Thus, the end-dressing mechanism is swung to inoperative position about the axis of the stud 161 (Fig. 4) through the connection between the piston rod 182 and the housing 152. The piston 125 is moved back to the right by flow of the pressure-fluid from the line 255 through the lines 256 and 140, the ball-check valve 258, and duct 260 into the left hand end of the cylinder 126. Thus, the side-dressing mechanism is swung to inoperative position through the connection between the piston rod 135 and the slide 41, which carries the side-dressing mechanism (Figs. 9, 7, 8, and 1). At this time, the right hand end of the cylinder 126 exhausts through the duct 141 and line 275. The piston 266 is moved back to the right by flow of the pressure-fluid through the line 255, the right-hand end of the cylinder 265 exhausting through the lines 276 and 275. This causes the pawl 271 to be reset with reference to the ratchet feed mechanism.

In the forward or rough-dressing strokes of the side and end dressers, the tip of the outside-dressing diamond moves in a plane 340 from a position such as denoted in dotted lines at 93' in Fig. 20 to the position 93'', while the inside-dressing diamond moves in a plane 341 from a position such as denoted at 96' in this figure to the position 96'', and while the end-dressing diamond moves in an arcuate path from a position such as denoted at 195' to the position 195''. During the movements of the dressing diamonds, the grinding wheel is, of course, rotating on its axis at high speed.

In prior types of dressing mechanisms, the three dressers were connected to operate together and to complete their operation together. As will be seen, however, the distances which outside and inside dressers have to cover in the dressing operation is much greater than the distance which the end dresser has to cover. As a result, in prior dressing mechanisms, the end dresser traveled at a much slower rate around the tip of the wheel than the rate of travel of the side dressers across the side surfaces of the wheel. Consequently in prior dressing mechanisms the end dresser dressed a helical surface of much finer lead on the tip surface of the wheel than the helical surfaces dressed by the side dressers on the side surfaces of the wheel. The tip surfaces became, in fact, practically burnishing surfaces and this is what caused burning of the bottoms and fillet portions of the tooth spaces of gears when the sides and bottoms of the tooth spaces were ground simultaneously.

This defect has been overcome with the present invention by provision of means for independently adjusting the rates of movement of the side and end dressers. During rough-dressing, the exhaust line 315 from the end dresser may be full open and the end dresser may travel at top speed over the rounds and tip of the wheel. By properly adjusting the valve 285 (Fig. 18), then, the rate of travel of the side dressers can be adjusted to rough-dress outside and inside helical surfaces on the wheel whose pitch or lead P is equal to or but slightly different from the pitch or lead P of the helical surfaces rough-dressed on the tip and rounds of the wheel.

The lead of the finished surfaces dressed on the sides of the wheel is controlled in the dressing mechanism illustrated, as already stated, by the setting of the throttle valve 314, and the lead of the finished tip surface of the wheel is controlled by the setting of the throttle valve 321. The shuttle valve 293 makes the movement of the end dresser independent of the movement of the side dressers and, moreover, insures that sufficient pressure is applied to the two pistons 102 and 154 to operate both in the time interval desired; the pressure line 310 that leads to the shuttle valve 293 is independent of and does not bleed the pressure line 251 that leads to the control valve 220. By adjusting the throttle valves 314 and 321, then, a helical surface can be dressed on the tip of the wheel which is of approximately the same lead as the helical surfaces dressed on the sides of the wheel. This is illustrated diagrammatically in Fig. 21, where it will be seen that the pitch P' of the finish-dressed tip surface of the wheel is equal to the pitch P' of the finish-dressed side surfaces of the wheel. In Fig. 21, 96''' denotes the position of the inside dressing tool at the end of its return or finishing stroke, while 93''' denotes the position of the outside dressing tool at the end of its return or finishing stroke, and 195''' denotes the position of the tip-dressing tool at the end of its return or finish stroke. In the finishing strokes, these tools move from the positions shown at 96'', 93'', and 195'', respectively, in Fig. 20 to the positions denoted at 96''', 93''', and 195''', respectively, in Fig. 21.

In the diagrammatic view of Fig. 21, it is assumed that the outside dresser is in contact with the wheel during its return swinging movement. This would be the case if there were a rigid or non-slipping contact between the arm 105 (Figs. 11 and 12) and the cam or disc 108 which controls the axial position of the shaft 90 that carries the outside dresser. Where the arm 105 is connected, however, to the control cam 108 through a lost motion device, such as the ball 106 and taper block 117 shown in Fig. 11, then on reversal of the motion of the shaft 90 at the end of the forward or roughing stroke of the outside dresser, there will be a slippage of the ball on the cam surface with the result that the shaft 90 will be axially displaced rearwardly and the outside dresser 93 will clear the outside surface of the wheel on the return or finishing stroke of the dresser. Hence, the outside surface of the wheel will not be dressed on the return stroke, but will have the finish produced on the roughing or forward stroke only of the outside dresser. A wheel so dressed is illustrated diagrammatically in Fig. 22 where 340a denotes the plane of swing of the tip of the outside dresser on its return stroke and 93a denotes the position of the outside dresser at the end of its return stroke. The inside dresser and tip dresser will perform the finish dressing operations on the inside and tip surfaces of the wheel as before. Thus, the inside and tip surfaces of the wheel will be dressed to helices having pitch P' while the outside surface will be left dressed to a helical surface having the pitch P.

A wheel such as shown in Fig. 22 can be used to grind gears at much higher speeds without fear of burning than can be done with any prior type wheel. Moreover, the gears will have substantially the same surface finish on both sides and in the bottoms of the tooth spaces.

If a circular disc, instead of a cam 170, is mounted on the shaft 147 (Fig. 3) to engage the follower 171, then the only movement that the end dresser has during dressing is a simple swinging movement about the axis of the shaft 147, and the end dresser will dress an arcuate tip surface on the wheel as shown in Figs. 20 to 22 inclusive. By employing a suitable cam 170, however, the end dresser can be rocked about the axis of the stud 161 (Fig. 4) during swing of the shaft 147 so as to dress a substantially flat surface on the wheel. This is illustrated diagrammatically in Fig. 23. Here 340 and 341 again denote the planes of movement of the outside and inside dressers 93 and 96. During the first part of the swing of the end dresser from one side of the wheel to the other, a dwell portion of the cam 170 is in contact with the rider, 171, and the movement of the dresser is effected solely by the rotation of the shaft 147 on its axis. Hence, the dresser may move from the position 195₁ to 195₂ dressing a round at the juncture of the tip surface 33 of the wheel with the outside surface 31. Then the rise on the cam surface 170 comes into engagement with the rider 171 and causes the whole end-dressing mechanism to be swung about the axis of the shaft 131 as the shaft 147 continues to rotate. The swinging movement about the stud 161 causes the dresser to dress a substantially flat surface on the tip of the wheel. In this movement, the diamond travels from position 195₂ to 195₃. Then the rider 171 again rides on a dwell portion of the cam 170 and the movement of the diamond is again controlled wholly by the swing of the shaft 147. Hence, as the dresser moves from position 195₃ to position 195₄, it dresses a round at the juncture of the inside surface 32 of the wheel with the tip surface 33 thereof. Of course, in the movements of the dressers they turn up helices on the surfaces being dressed, as already described, but these helices have been omitted in Fig. 23 for the purpose of clearness in illustration.

The operation of the dressing mechanism of the present invention, as illustrated, will be understood from the preceding description but may be summed up here briefly. First of all, of course, the various adjustments are made that are required to position the dressers in correct dressing relation to the wheel. Thus, the ring member 35 (Figs. 1 and 2) is adjusted on sleeve 29 to position the side dressers at a point to minimize possibility of interference of the side-dressing mechanism with the work during grinding, and the plate 205 (Fig. 5) is adjusted on the ring member 35 to minimize possibility of interference of the end-dressing mechanism with the work; the slide 41 is adjusted rectilinearly on the extension 40 (Fig. 8) of the ring member 35 in accordance with the principles of Wildhaber et al. Patent No. 2,311,302 above mentioned and depending on whether substantially straight, convex, or concave profiles are desired on the sides of the grinding wheel; the plate 55 is adjusted rectilinearly on the bracket 50 (Figs. 1 and 9) in accordance with the diameter of the grinding wheel to be dressed; and the plate 65 is adjusted rectilinearly on the plate 55 in accordance with the height of the wheel; the housing 75 is adjusted angularly on the plate 65 in accordance with the pressure angles of the inside and outside surfaces of the wheel. Thus, also, the bracket 195 is adjusted on the plate 205 (Fig. 5) to position the end dresser in accordance with the height of the wheel; and the slide 160 is adjusted on the bracket 195 in accordance with the diameter of the wheel. The throttle valve 285 (Fig. 18) is adjusted to control the rate of movement of the side dressers relative to that of the end dresser during rough-dressing; and the throttle valves 314 and 321 (Figs. 19 and 18) are adjusted to control the relative rates of movement of the side and end dressers during finish-dressing. Cams 170, 168 and 120 (Figs. 3, 5, 11, 12, and 2) of suitable configuration are selected in accordance with the shapes which it is desired to dress on the tip and sides of the wheel.

Assuming that the necessary adjustments have been made, when the operator desires to dress the wheel, he moves the control valve 220 from the position shown in Fig. 14 to that shown in Fig. 15 to put the line 275 on supply and the line 255 on exhaust and bring the side and end dressers into operative position and advance the grinding wheel axially in accordance with wear of the wheel and the amount of stock to be removed therefrom. Thus, the piston 180 swings the housing 152 (Figs. 3 and 4) about the pivot stud 131, moving the end dresser into operative relation with the grinding wheel; the piston 125 swings the bracket 50 (Figs. 7, 8 and 9) about the hinge pin 51 moving the side dressers into operative relation with the grinding wheel; and the piston 266 (Fig. 18) rocks the arm 269 causing the pawl 271 and ratchet wheel 273 to actuate the wheel-feed mechanism.

Then the operator moves the control valve 220 (Fig. 18) on further to the position shown in Fig. 16 to put the line 280 on supply and the line 281 on exhaust. This forces the piston 102 downwardly to rock the side-dresser arms 92 and 95 (Figs. 1 and 2) about the axes of shafts 90 and 91, respectively, causing the side dressers to rough-dress the outside and inside surfaces of the wheel; and it permits the spring 294 to shift the shuttle valve 293, putting the line 316 on supply and the line 315 on exhaust, causing the piston 154 to swing the arm 146 (Figs. 3 and 4) and move the end dresser over the tip of the wheel from one side thereof to the other to rough-dress the tip of the wheel and the rounds joining the tip with the sides of the wheel. During the described rough-dressing movement of piston 102, the rate of swing of the side dressers is controlled by the setting of the throttle valve 285; during this movement, also, the side-dresser shafts 90 and 91 are moved axially under control of the cams 108 and 120 to dress the desired profile shapes on the sides of the wheel; and during the described swing of the end dresser from one side of the wheel to the other, the cam 170 (Figs. 3 and 5) operates to swing the housing 152 about pivot-stud 161 (Fig. 4) to dress a flat surface on the tip of the wheel or such other shape as may be desired.

The operator then reverses the movement of the control valve 229 (Fig. 18) moving it back to the position of Fig. 15, putting line 281 on supply and line 280 on exhaust. This causes piston 102 to be returned to its initial position and the side dressers effect their finish-dressing movements; it also causes the shuttle valve 293 to be shifted against the resistance of spring 294, putting line 315 on supply and line 316 on exhaust, so that the piston 154 is returned to initial position and the end dresser finish-dresses the tip and rounds on the wheel. At the time of reversal of movement of the outside dresser, the lost motion device 106—117 (Fig. 11) functions to permit spring 110 (Fig. 2) to shift the shaft 90 axially, causing the outside dresser to be withdrawn from operative engagement with the wheel. Hence, on the return, dressing stroke of the piston 102, only the inside of the wheel will be finish-dressed, while the outside will be left with the coarser surface dressed on it in the rough-dressing operation.

The setting of the throttle valve 314 (Fig. 19) controls the finish produced on the inside of the wheel and the cam 120 (Fig. 2) controls the axial movement of the inside dresser on its finishing stroke as well as on its roughing stroke to govern the profile shape dressed on the inside of the wheel. The setting of the throttle valve 321 controls the finish produced on the rounds and tip of the wheel in the finish-dressing operation so that by adjustment of this valve and valve 314 (Fig. 19) substantially the same finish can be secured on the tip and rounds of the wheel as on the inside thereof. The cam 170 (Figs. 3 and 5) operates, of course, during the return finishing-swing of the end dresser as well as during the forward roughing-swing of this dresser to control the shape produced on the tip of the wheel.

The dressing operation is now completed, and the operator moves the valve 229 (Fig. 18) back to its initial position to put the line 255 on supply and the line 275 on exhaust, causing the pistons 180 and 125 to swing the end and side-dressing mechanisms away from the wheel to inoperative position and the piston 266 to reset the ratchet feed mechanism. The grinding machine itself can then be put into operation to grind a gear with the now completely dressed wheel.

With the dressing mechanism described, it will be seen that because each surface of the grinding wheel is dressed in accordance with the work it is to do, the tooth surfaces and tooth space bottoms and fillets of a gear, ground with the wheel, may all have substantially the same surface finish. Moreover, with the dressing mechanism described, gears can be ground more rapidly than heretofore because heretofore the speed of the grinding operation has been restricted due to the possibilities of burning the tooth surfaces with outside and tip of the wheel; possibilities that have been obviated by the present invention.

It is understood, of course, that while usually the rounds and tip of an annular wheel will be dressed to have substantially the same finish as the inside of the wheel and that the outside of the wheel will usually be dressed to a coarser finish, this is by no means always the case. With the mechanism described, it is possible to control completely the finish dressed on any surface of the wheel. Thus the tip surface may be dressed to the same finish as the inside surface and to a different finish from the outside surface, or any two of the surfaces may be dressed alike with the third surface different, or all three surfaces may be dressed to have different finishes. It is the character of the work, which is to be ground with the wheel, that governs the type of finish to be dressed on any given surface of the wheel. Moreover, it is to be understood that while the invention has been described in connection with the dressing of annular grinding wheels, it will be understood that it applies also, particularly as regards dressing of the rounds and tip, to the dressing of other types of grinding wheels as, for instance, disc and cup-shaped grinding wheels.

Further, while the invention has been described in connection with several different embodiments thereof, it will be understood that it is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the limits of the invention or the scope of the appended claims.

Having thus described our invention, what we claim is:

1. The method of dressing a rotary annular grinding wheel which comprises dressing the outside surface of the wheel by moving a dressing tool at a relatively fast rate across said surface of the wheel, and dressing the inside surface of the wheel by moving a dressing tool at a relatively slow rate across said surface of the wheel, the wheel being rotated continuously on its axis during each dressing operation, whereby to produce a coarser finish on the outside surface of the wheel than on the inside surface thereof.

2. The method of dressing a rotary annular grinding wheel which comprises rotating the wheel on its axis while imparting reciprocating movements to an inside and an outside-dressing tool, the forward movement of each tool being at a relatively fast rate and the return movement of each tool being at a relatively slow rate, and holding both tools in engagement with the respective sides of the wheel during their forward strokes and the inside-dressing tool during its return stroke, but withdrawing the outside-dressing tool from operative position during its return stroke, so that the outside surface of the tool is dressed only at a fast rate while the inside surface is dressed successively at fast and slow rates.

3. The method of dressing a rotary annular grinding wheel which comprises dressing the outside surface of the wheel by moving a dressing tool at a relatively fast rate across the outside of the wheel, and dressing the inside surface of the wheel by moving a dressing tool at a fast rate in one direction across the inside surface of the wheel and then at a relatively slow rate in the opposite direction, the wheel during dressing being rotated on its axis, and the rate of the fast movement during dressing of the inside of the wheel being substantially equal to the rate of dressing of the outside of the wheel.

4. The method of dressing a rotary annular grinding wheel which comprises moving separate outside, inside, and end-dressing tools across the outside, inside, and tip surfaces of the wheel while rotating the wheel on its axis, the inside and end-dressing tools being moved at substantially the same rate but the outside dressing tool being moved at a relatively faster rate.

5. The method of dressing a rotary annular grinding wheel which comprises dressing the outside surface of the wheel by moving a dressing tool at a relatively fast rate across said surface, dressing the tip surface of the wheel by moving a dressing tool at a relatively slow rate across said surface, and dressing the inside surface of the wheel by moving a dressing tool across the last named surface at approximately the same rate as the rate of movement of the dressing tool in dressing the tip of the wheel but at a slower rate of movement than that of the tool in dressing the outside of the wheel, the wheel being rotated on its axis during dressing of each of its surfaces.

6. The method of dressing a rotary annular grinding wheel which comprises rotating the wheel on its axis while simultaneously imparting reciprocatory movements to separate inside, outside, and end-dressing tools, the forward movement of each tool being at a relatively fast rate, and the return movement of each tool being at a relatively slow rate, and the inside and end-dressing tools being held in engagement with the inside and tip surfaces of the wheel during their movements in both directions, but the outside-dressing tool being withdrawn from engagement with the wheel during its return movement.

7. The method of dressing a rotary annular grinding wheel which comprises dressing the outside surface of the wheel by moving a dressing tool at a relatively fast rate across said surface of the wheel, and dressing each of the inside and tip surfaces of the wheel by moving a dressing tool across the inside and tip surfaces, respectively, first in one direction at a relatively fast rate and then in the opposite direction at a relatively slow rate, whereby the inside and tip surfaces of the wheel are dressed to a finer finish than the outside surface thereof.

8. The method of dressing a grinding wheel which comprises simultaneously dressing side and tip surfaces of the wheel by moving separate dressing tools first in one direction at a relatively fast rate of speed across the said surfaces of the wheel to rough-dress said surfaces, and then moving said dressing tools in the opposite direction at a relatively slow rate of speed to finish-dress said surfaces, the rates of finish dressing movement of the tools being substantially equal.

9. The method of dressing a grinding wheel which comprises dressing side and tip surfaces, respectively, of the wheel by moving a dressing tool first in one direction at a relatively fast speed then in the reverse direction at a relatively slow speed across said side and tip surfaces, respectively, the rates of dressing the side and tip surfaces of the wheel during the slow speed movement being substantially equal.

10. The method of dressing a grinding wheel which comprises moving separate dressing tools across opposite side surfaces of the wheel first in one direction at a relatively fast rate and then in the opposite direction at a relatively slow rate, and withdrawing one of the tools from operative relation with the wheel on its return stroke so that said tool dresses the wheel on its movement in one direction only while the other tool dresses the wheel on its movements in both directions.

11. Mechanism for dressing the side and the tip surfaces of a rotary wheel for grinding gears comprising a support, a dressing tool reciprocably mounted on the support for dressing one side of the wheel, a second dressing tool reciprocably mounted on the support for dressing the tip of the wheel, means for simultaneously reciprocating both tools and means for controlling the relative rates of movement of the two tools so that during their strokes in one direction, at least, both tools move at the same rate.

12. Mechanism for dressing a grinding wheel comprising a support, a pair of dressers movably mounted on said support and adapted to dress opposite sides of the wheel, respectively, means for moving each dresser at a relatively fast rate in one direction and at a relatively slow rate in the opposite direction, and means controlling the positions of the two dressers so that one of the dressers is in operative engagement with the wheel during its strokes in both directions and the other dresser is in operative engagement with the wheel during its strokes in one direction only and is out of operative position during its strokes in the other direction.

13. In a dressing mechanism, a support, a pair of shafts journaled in said support, an arm secured to each shaft, dressing tools carried by the two arms and adapted to dress opposite sides of a grinding wheel, respectively, means for rocking the arms back and forth to effect dressing operations, and means for moving one of the shafts axially at opposite ends of its swinging movement to move the tool carried thereby to and from operative engagement with the grinding wheel so that it is in operative engagement with the wheel on swing of the arm in one direction only and is out of operative relation with the wheel during swing in the opposite direction.

14. In a dressing mechanism, a support, an oscillatable shaft journaled in said support, an arm secured to said shaft at one end thereof, a dressing tool carried by said arm and adapted to dress a side of a grinding wheel, a second arm secured adjacent to the opposite end of said shaft, a control member secured to said support, a ball and a race for said ball carried by said second arm, said ball being disposed to roll on said control member during swing of said shaft and said race being inclined to the axis of said shaft and being of sufficient diameter to permit free movement of the ball on the race whereby on reversal of the shaft at opposite ends of its swing, the shaft is displaced axially to move the dressing tool carried thereby into or out of operative relation with the grinding wheel, and means for oscillating said shaft.

15. A dressing mechanism for dressing a grinding wheel comprising a support, a housing pivotally mounted on the support, a shaft journaled in the housing with its axis extending in a direction at right angles to the pivotal axis of the housing, an arm secured to the shaft, a dressing tool secured to said arm in offset relation to the axis of the shaft, means for rotating the shaft to move the dressing tool across the tip of the grinding wheel and from one side of the wheel to the other, a cam and a follower engaging said cam, one of which is secured to the shaft, and the other of which is mounted on the support, said cam being so formed that at a predetermined point in the rotation of the shaft the housing will be rocked on its pivot.

16. A dressing mechanism for grinding wheels, comprising a pair of side-dressing tools for dressing opposite sides of a wheel, respectively, and an end-dressing tool for dressing the tip of the wheel, means for swinging each of the side-dressing tools first in one direction and then in the other about an axis inclined to a side surface of the wheel at the pressure angle of said side surface, means for swinging the end-dressing tool back and forth from one side of the wheel to the other simultaneously with the movement of the side-dressing tools, and means for retracting one of the side-dressing tools from operative position on its return swing movement.

17. A dressing mechanism for grinding wheels comprising a pair of side-dressing tools for dressing opposite sides of a wheel, respectively, and an end-dressing tool for dressing the tip of the wheel, means for swinging each of the side-dressing tools first in one direction and then the other about an axis inclined to a side surface of the wheel at the pressure angle of said side surface, means for swinging the end-dressing tool back and forth from one side of the wheel to the other simultaneously with the movement of the side-dressing tools, means for separately controlling the rates of movement of the side and end dressers on both their forward and return strokes, and means for retracting one of the side-dressing tools from operative position on its return stroke.

18. A dressing mechanism for grinding wheels comprising a side-dressing tool and a tip-dressing tool, separate fluid-pressure operated means for reciprocating said dressing tools to effect the dressing operations simultaneously, a single control valve controlling the directions of movement of the two fluid-pressure operated means, and separate, adjustable throttle valves for controlling, respectively, the relative rates of movement in opposite directions of the two said fluid-pressure operated means, said throttle valves being adjustable so that the tip dressing tool may move at the same rate as the side dressing tool.

19. A dressing mechanism for grinding wheels comprising a side-dressing tool and a tip-dressing tool, fluid-pressure operated means comprising a cylinder and a piston movable therein for actuating each of the dressing tools, a reversible shuttle valve for controlling the direction of application of fluid pressure to one of said pistons, a control valve controlling both the direction of application of fluid pressure to the other of said pistons and the direction of movement of said shuttle valve, and an adjustable throttle valve for controlling the exhaust from one end of one piston to permit of adjustment of the relative rates of movement of the two pistons.

20. A dressing mechanism for grinding wheels comprising a side-dressing tool and a tip-dressing tool, fluid-pressure operated means comprising a cylinder and a piston movable therein for actuating each of the dressing tools, a reversible shuttle valve controlling the direction of application of fluid pressure to one of said pistons, a control valve controlling both the operation of the shuttle valve and the direction of application of fluid pressure to the other piston, adjustable throttle valves controlling the rates of movement of each piston in one direction, and an adjustable throttle valve for controlling the rate of movement of one piston in the opposite direction.

21. Dressing mechanism for a grinding wheel comprising a side dresser and a tip dresser, fluid-pressure operated means for actuating each of the dressers, means for adjusting the rate of movement of the end dresser in one direction, means for adjusting the rates of movement of the side dresser in both directions, and a single control valve for controlling the directions of movements of the two dressers.

22. In a grinding machine, a support, a tool spindle journaled in said support, a grinding wheel secured to the tool spindle, a tip dresser and a side dresser movably mounted on said support, fluid-pressure operated means for reciprocating the side dresser, fluid pressure operated means for reciprocating the tip dresser, fluid-pressure operated means for moving the tool spindle axially to advance the grinding wheel to control the amount of stock to be dressed from the wheel and for resetting the spindle-advancing means, means for separately adjusting the rates of movements of the two first fluid-pressure operated means, a reversible shuttle valve for controlling the direction of movement of one of the two first named fluid-pressure operated means, and a single control valve for controlling the position of the shuttle valve and the direction of movement of the other two fluid-pressure operated means.

23. In a grinding machine, a support, a grinding wheel rotatably mounted on said support, a dresser carrier movably mounted on said support, a dressing tool movably mounted on the carrier, fluid-pressure operated means for moving the carrier on the support in opposite directions to move the dressing tool into and out of operative relation with the wheel, fluid-pressure operated means for actuating the dressing tool when in operative position, and a single control valve for controlling the operation of both fluid-pressure operated means and operable, when moved in one direction, to cause the two fluid-pressure operated means to be actuated successively to first move the carrier into operative position and then move the dressing tool in one direction across the grinding wheel.

24. In a grinding machine, a support, a spindle journaled in said support, a grinding wheel secured to the spindle, a pair of carriers pivotally mounted on said support, a side-dressing tool movably mounted on one of said carriers, and a tip-dressing tool movably mounted on the other carrier, fluid-pressure operated means for rocking said carriers about their respective pivots to move the dressing tools to and from operative relation with the wheel, fluid-pressure operated means for actuating the dressing tools, when in operative position, to dress the wheel, and a single control valve for controlling the movements of said carriers and dressing tools and operable when moved in one direction to cause the carriers to be first moved into operative position and to then cause the dressing tools to dress the wheel.

25. In a grinding machine, a support, a tool spindle journaled in said support, a grinding wheel secured to the tool spindle, a housing pivotally mounted on the support, a shaft journaled in the housing, an arm secured to said shaft, a tip-dressing tool mounted on said arm, a cam secured to said shaft, a follower carried by the support and engaging said cam, said cam being shaped to impart swinging movement to the housing during a predetermined part of the oscillation of the shaft on its axis, means for oscillating the shaft to move the dressing tool from one side of the wheel to the other, and means for swinging the housing on the support, independently of the action of the cam, to move the dressing tool to and from operative position.

26. In a grinding machine, a support, a tool spindle journaled in said support, a grinding wheel secured to the tool spindle, a housing pivotally mounted on the support, a shaft journaled in the housing, fluid-pressure operated means for oscillating said shaft, an arm secured to the shaft, a tip-dressing tool mounted on said arm, a follower carried by said support, a cam secured to the shaft to engage said follower and shaped to impart swinging movement to the housing during a predetermined part of the rotation of the shaft, fluid-pressure operated means for swinging the housing on the support to move the dressing tool to and from operative position, and a single control valve controlling the operation of both fluid-pressure operated means and operable first to move the housing into operative position, then to move the shaft successively in opposite directions, and then to swing the housing out of operative position.

27. In a grinding machine, a support, a spindle journaled in the support, a grinding wheel mounted on the spindle, a housing movably mounted on the support, a dressing tool movably mounted in the housing, fluid-pressure operated means for moving the housing on the support to move the dressing tool to and from operative relation with the grinding wheel, fluid-pressure operated means operable, during movement of the housing to operative position, to move the spindle axially to advance the grinding wheel in accordance with the amount of stock to be dressed off of the wheel in the ensuing dressing operation, fluid-pressure operated means for actuating the dressing tool, when in operative position, to dress the wheel, and a single control valve for controlling the operations of all said fluid-pressure operated means.

28. Mechanism for dressing the side and tip surfaces of a rotary grinding wheel comprising a support, a dressing tool reciprocably mounted on the support for dressing one side of the wheel, a second dressing tool reciprocably mounted on the support for dressing the tip of the wheel, means for simultaneously reciprocating both tools, and means adjustable to control the rates of movement of the two tools so that each moves at a faster rate on its forward strokes than on its return strokes and so that the return strokes of the two tools are at approximately the same rate.

29. Mechanism for dressing a grinding wheel comprising a support, a pair of dressers movably mounted on said support and adapted to dress opposite sides, respectively, of the wheel, means for moving each dresser at a relatively fast rate in one direction and at a relatively slow rate in the opposite direction, and means controlling the positions of the two dressers so that one of the dressers is in operative engagement with the wheel during its strokes in both directions and the other is in operative engagement with the wheel during its fast stroke only and is out of operative engagement with the wheel on its return stroke.

30. A dressing mechanism for grinding wheels comprising a pair of side-dressing tools for dressing opposite sides, respectively, of a wheel, and an end-dressing tool for dressing the tip of the wheel, means for reciprocating each of the tools and means adjustable to control the rates of the tool movements so that each moves at a faster rate on its forward strokes than on its return strokes, and means for retracting one of the side-dressing tools from operative position on its return strokes.

PAUL F. BARKER.
HERBERT G. HARTMAN.
CLARENCE T. GALLOWAY.
BERNARD M. KUNES.